US006439943B1

(12) United States Patent
Aoki et al.

(10) Patent No.: US 6,439,943 B1
(45) Date of Patent: Aug. 27, 2002

(54) MANUFACTURING METHOD OF PLASMA DISPLAY PANEL THAT INCLUDES ADIELECTRIC GLASS LAYER HAVING SMALL PARTICLE SIZES

(75) Inventors: Masaki Aoki, Minoo; Yasuhisa Ishikura; Katsuyoshi Yamashita, both of Katano; Shinya Fujiwara, Kyoto; Yasuyuki Akata, Takatsuki, all of (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/309,428

(22) Filed: May 11, 1999

(30) Foreign Application Priority Data

May 12, 1998 (JP) .......................................... 10-127989
Jun. 2, 1998 (JP) .......................................... 10-153323
Jun. 5, 1998 (JP) .......................................... 10-157295
Sep. 7, 1998 (JP) .......................................... 10-252548
Jan. 12, 1999 (JP) .......................................... 11-005016

(51) Int. Cl.[7] .............................. H01J 9/24; H01J 9/00; C03C 8/16; C03C 8/10; C03C 8/04

(52) U.S. Cl. ............................ 445/24; 501/20; 501/22; 501/26; 501/32

(58) Field of Search ....................... 445/23, 24; 501/20, 501/22, 25–26, 32, 45–46, 48, 76, 78–79; 313/586, 582

(56) References Cited

U.S. PATENT DOCUMENTS 6,010,973 A * 1/2000 Watanabe et al. ............. 501/20
6,043,604 A * 3/2000 Horiuchi et al. ............ 313/582
6,046,121 A * 4/2000 Masuko et al. ............... 501/20
6,184,621 B1 * 2/2001 Horiuchi et al. ............ 313/586
6,194,333 B1 * 2/2001 Ryu ............................ 501/32

OTHER PUBLICATIONS

"Study of Habitable Size Region for TFT–LCD and PDP," by D. A. Imeijingu, Display and Imaging, vol. 6, 1997, pp. 65–71.

"Material Report Review—(Current State and Problems of Plasma Display—Centered on Process and Material Technology)," by H. Murakami, Kinoh–Zairyo (Functional Materials), vol. 16, No. 2, Feb. 1996, pp. 5–12.

"Technology of PDP Manufacturing Process (Wafer Processing)," (Monthly Magazine, "LCD Intelligence (Gekkan LCD Intelligence) 1997.8" (with partial English translation).

"Latest Technology of Manufacturing Plasma Display," (Press Journal, Inc.), 1997.

* cited by examiner

*Primary Examiner*—Kenneth J. Ramsey
*Assistant Examiner*—Mack Haynes
(74) *Attorney, Agent, or Firm*—Price and Gess

(57) ABSTRACT

The object of the present invention is to provide a high-intensity, reliable plasma display panel even when the cell structure is fine by resolving the problems such as a low visible light transmittance and low voltage endurance of a dielectric glass layer. The object is realized by forming the dielectric glass layer in the manner given below. A glass paste including a glass powder is applied on the front glass substrate or the back glass substrate, according to a screen printing method, a die coating method, a spray coating method, a spin coating method, or a blade coating method, on each of which electrodes have been formed, and the glass powder in the applied glass paste is fired. The average particle diameter of the glass powder is 0.1 to 1.5 μm and the maximum particle diameter is equal to or smaller than three times the average particle diameter.

18 Claims, 10 Drawing Sheets

MANUFACTURING METHOD OF PLASMA DISPLAY PANEL THAT INCLUDES ADIELECTRIC GLASS LAYER HAVING SMALL PARTICLE SIZES

This application is based on an application Nos. 10-127989, 10-153323, 10-157295, 10-252548, and 11-5016 filed in Japan, the contents of which are hereby incorporated by reference.

BACKGROUND OF THE INVENTION (1) Field of the Invention

The present invention relates to a plasma display panel used for a display device, and especially relates to a plasma display panel including an improved dielectric glass layer.

(2) Description of the Prior Art

Recently, expectations for a high-definition TV and a large-screen TV have been raised. For such a TV, a CRT display, a liquid crystal display, or a plasma display panel has been conventionally used as a display device. A CRT display is superior to a plasma display panel and a liquid crystal display in resolution and image quality. A CRT display, however, is not suitable for a large screen that measures more than 40 inches because the depth. dimension and the weight are too large. A liquid crystal display is superior in consuming a relatively low power and requiring a relatively low voltage. A liquid crystal display, however, has disadvantages of a limited screen size and viewing angle. On the other hand, a plasma display panel realizes a large screen. Screens that measure in the 40 inches have been developed using plasma display panels (described in "Kino Zairyo (Functional Materials)" (Vol. 16, No. 2, February issue, 1996, p7), for instance).

FIG. 13 is a perspective view of the essential part of a conventional ac plasma display panel. In FIG. 13, a reference number 131 refers to a front glass substrate made of borosilicate sodium glass. On the surface of the front glass substrate, display electrodes 132 are formed. The display electrodes 132 are covered by a dielectric glass layer 133. The surface of the dielectric glass layer 133 is covered by a magnesium oxide (MgO) dielectric protective layer 134. The dielectric glass layer is formed using a glass powder the particle diameter of which ranges from 2 to 15 μm on average.

A reference number 135 refers to a back glass substrate. On the surface of the back glass substrate 135, address electrodes 136 are formed. The address electrodes 135 are covered by a dielectric glass layer 137. On the surface of the dielectric glass layer 137, walls 138 and phosphor layers 139 are formed. Between the walls 138, discharge spaces 140 are formed. The discharge spaces 140 are filled with discharge gas.

A full-specification, high-definition TV is expected to realize the pixel level given below. The number of pixels is 1920×1125. The dot pitch is 0.15 mm ×0.48 mm for a screen that measures around 42 inches. The area of one cell is as small as 0.072 mm$^2$. The area is 1/7 to 1/8 compared with a 42-inch, high-definition TV according to a conventional NTSC (National Television System Committee) (the number of pixels is 640×480, the dot pitch is 0.43 mm×1.29 mm, and the area of one cell is 0.55 mm$^2$).

As a result, the intensity of the panel decreases for the full-specification, high-definition TV (described in "Disupurei Ando Imeijingu (Display and Imaging)" Vol. 6, 1992, p70, for example).

In addition, not only the distance between the discharge electrodes is shorter, but also the discharge space is smaller for the full-specification, high-definition TV. As a result, when the plasma display panel gains the same capacity as a capacitor, it is necessary to set the thickness of the dielectric glass layers 133 and 137 to be smaller than in a conventional one.

Here, the explanation of three methods of forming a dielectric glass layer will be given below.

In the first method, a glass paste is made of a glass powder the particle diameter and the softening point of which ranges from 2 to 15 μm on average and from 550 to 600° C., and a solvent such as terpineol including ethyl cellulose and butyl carbitol acetate using a trifurcated roll. The glass paste is printed on the front glass substrate according to a screen printing method (the glass paste is adjusted so that the viscosity is 50,000 to 100,000 cp, which is suitable for the screen printing method). The printed glass paste is dried, and undergoes sintering at a temperature around the softening point of the glass powder (550 to 600° C.), forming a dielectric glass layer.

In the first method, the melted glass rarely reacts to the electrode made of Ag, ITO, Cr-Cu-Cr, or the like since the glass paste undergoes sintering at a temperature around the glass powder softening point and the glass is inert, i.e., the glass does not flow well. As a result, the resistance of the electrode does not increase, the electrode ingredients do not dispersed in or not color the glass, and a dielectric glass layer is formed with one firing. On the other hand, the glass paste does not flow well since the particle diameter of the glass powder ranges from 2 to 15 μm on average and the glass paste is fired at a temperature around the softening point of the glass powder, and the mesh pattern of the screen remains in this method. As a result, the surface of the formed dielectric glass layer is rough (the surface roughness is 4 to 6 μm), and visible light is scattered on the coarse surface. In other words, the dielectric glass layer is a ground glass and the transmittance is relatively low. In addition, bubbles and pinholes appear in the formed dielectric glass layer, so that the voltage endurance of the dielectric glass layer is decreased. Here, the voltage endurance means the limitation of the insulation effect of a dielectric glass layer when a voltage is applied to the dielectric glass layer.

In the second method, a glass paste (the viscosity is 35,000 to 50,000 cp (centipoise)) is made using a low-melting lead glass powder (the proportion of PbO is about 75%) the particle diameter and the softening point of which ranges from 2 to 15 μm on average and from 450 to 500° C. The glass paste is printed on the front glass substrate according to a screen printing method and dried. The dried glass paste undergoes sintering at a temperature about 100° C. higher than the softening point of the glass powder, i.e., at 550 to 600° C., forming a dielectric glass layer. In the second method, the surface of the formed dielectric glass layer is smooth (surface roughness is about 2 μm) since the sintering temperature is considerably higher than the softening point and the glass paste flows well. In addition, a dielectric glass layer is formed with one sintering.

On the other hand, the melted glass reacts to the electrode made of Ag, ITO, Cr-Cu-Cr, or the like since the glass paste is activated and flows well. As a result, the resistance of the electrode increases and the dielectric glass layer is colored. In addition, large bubbles are likely to appear in the dielectric glass layer as a result of the reaction to the electrode.

The third method is the combination of the first and second methods (refers to Japanese Laid-Open Patent Application Nos. 7-105855 and 9-50769). In the third method, a glass paste is made of a glass powder the particle diameter and the softening point of which ranges from 2 to 15 $\mu$m on average and from 550 to 600° C. The glass paste is printed on the front glass substrate according to the screen printing method. The printed glass paste is dried, and undergoes sintering at a temperature around the softening point, forming a dielectric glass layer. On the formed dielectric glass layer, another dielectric glass layer is further formed. A glass paste is made of a glass powder the particle diameter and the softening point of which ranges from 2 to 15 $\mu$m on average and from 450 to 500° C. The second glass paste is printed on the previously formed dielectric glass layer according to the screen printing method. The printed second glass paste is dried, and undergoes sintering at a temperature about 100° C. higher than the softening point, i.e., at 550 to 600° C., forming the second dielectric glass layer.

Due to the bilevel structure, the melted glass rarely reacts to the electrode and the surface of the dielectric glass layer is smooth, resulting in an improved transmittance of visible light and endurance to voltage. At the same time, however, the method of forming the dielectric glass layer is complicated and a thinner dielectric glass layer, which is necessary to improve the intensity, is difficult to form. In addition, the visible light transmittance is not improved so much since bubbles appear in the first formed dielectric glass layer.

SUMMARY OF THE INVENTION

It is accordingly an object of the present invention to provide a reliable, high-intensity plasma display panel in which the visible light transmittance is high even when the plasma display has a fine cell structure since the problems of low visible light transmittance and low voltage endurance are solved. The above-mentioned object may be achieved by the manufacturing method of plasma display given below.

In the manufacturing method of plasma display, a glass paste including a glass powder the average particle of which is 0.1 to 1.5 $\mu$m and the maximum particle diameter of which is equal to or smaller than three times the average particle diameter is printed on the front glass substrate or the back glass substrate on which electrodes have been formed according to a screen printing method, a die coating method, a spray coating method, a spin coating method, and a blade coating method. Then, the glass powder in the printed glass paste undergoes sintering, forming a dielectric protective layer.

The object of the present invention may be realized since a dielectric glass layer having a relatively smooth surface and including a minimum amount of bubbles is formed using the glass powder that has been described.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIGS. 4A to 4D show the process of forming an ITO transparent electrode;

FIG. 4E shows the process of forming a bus line;

DESCRIPTION OF THE PREFERRED EMBODIMENT

First of all, the explanation of the structure of a plasma display panel (referred to as a "PDP" in this specification) according to the preferred embodiment of the present invention will be given with reference to figures.

Figure 1:
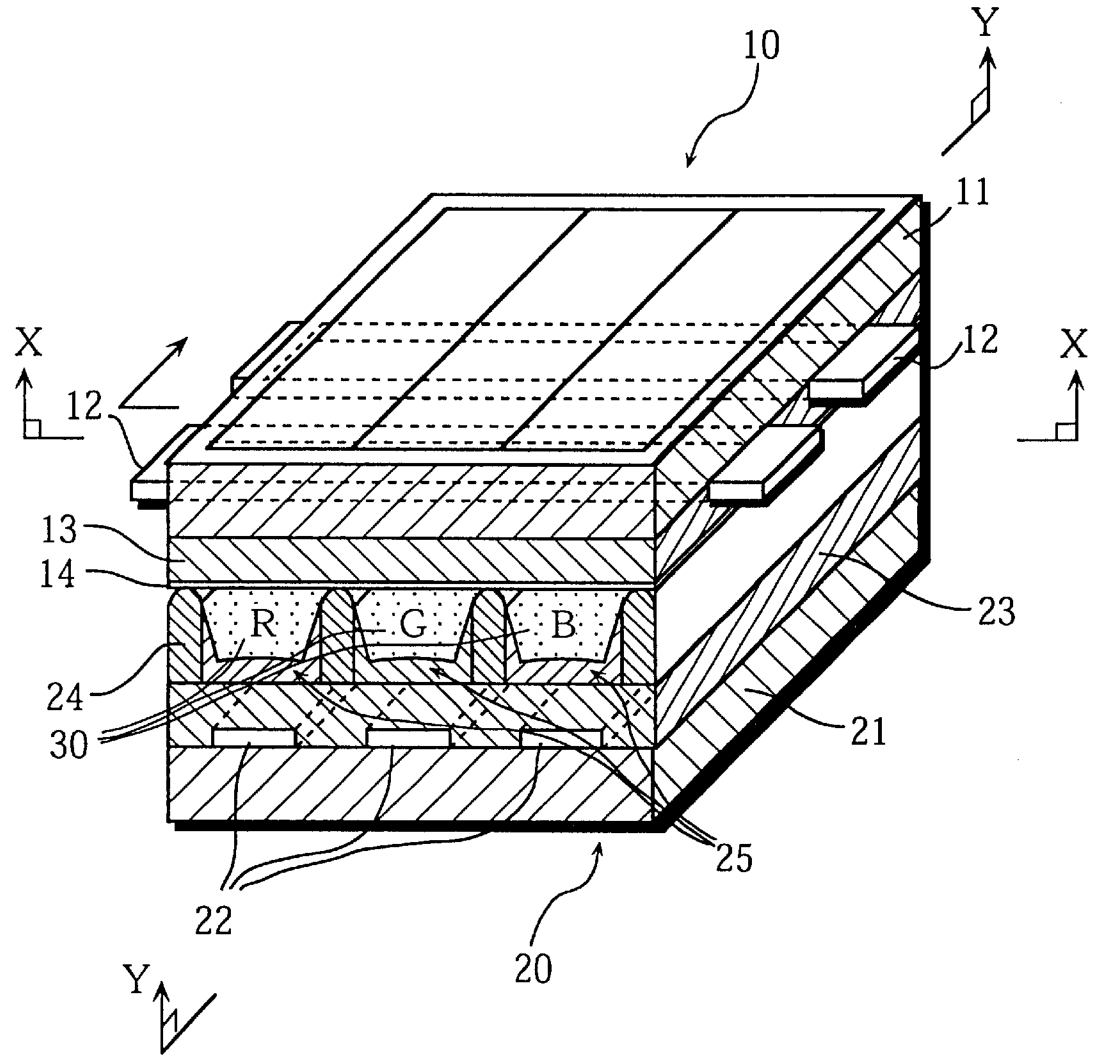
FIG. 1 is a perspective view of the main structure of an ac discharge plasma display panel.
Figure 2:
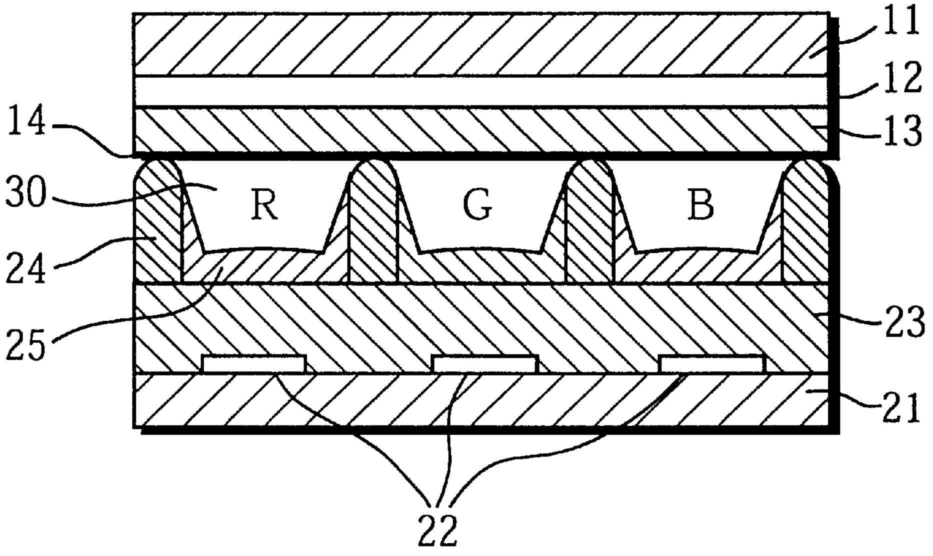
FIG. 2 is a vertical sectional view taken on line X—X of FIG. 1.
Figure 3:
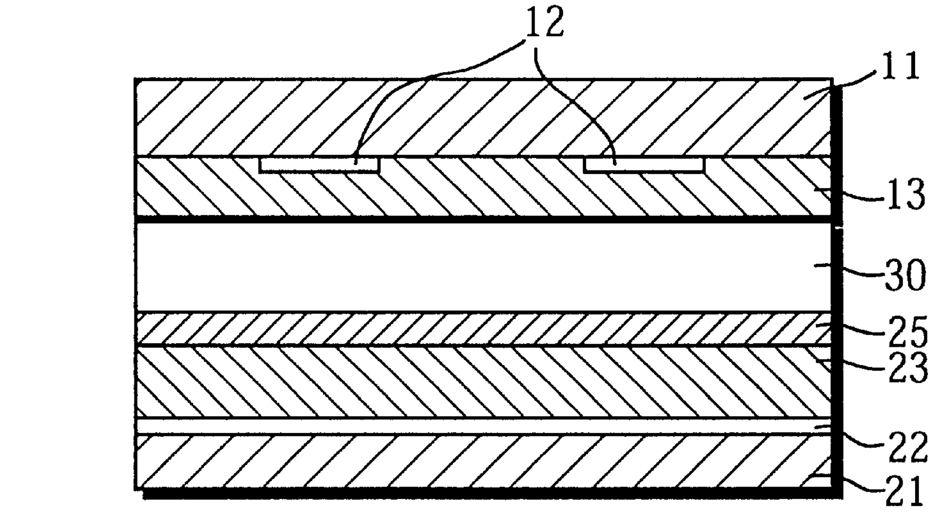
FIG. 3 is a vertical sectional view taken on line Y—Y of FIG. 1.

FIG. 1 is a perspective view of the essential part of an ac discharge PDP according to the present embodiment. FIG. 2 is a vertical sectional view taken on line X—X of FIG. 1. FIG. 3 is a vertical sectional view taken on line Y—Y of FIG. 1. Although the number of cells is three in FIGS. 1 to 3 for convenience in explanation, a large number of cells each of which emits light of red (R), green (G), or blue (B) are arranged on the PDP.

FIGS. 1 to 3 shows the structure of the PDP. A front panel 10 is stuck to a back panel 20. The front panel 10 is formed by placing discharge electrodes (display electrodes) 12, a dielectric glass layer 13, and a protective layer 14 on a front glass substrate 11. The back panel 20 is formed by placing address electrodes 22, a dielectric glass layer 23, walls 24, and phosphor layers 25, each of which has a different color "R (red)", "G (Green)", and "B (blue)", on a back glass substrate 21. In discharge spaces 30 between the front panel 10 and the back panel 20, discharge gas is filled. In the discharge electrode, a metal electrode made of Ag, or Cr-Cu-Cr is placed as a bus line on a transparent electrode made of ITO or $SnO_2$ (not illustrated).

Here, suppose that the area of the plane facing the discharge electrode is "S", the thickness of the dielectric glass layers 13 and 23 is "d", the permittivity of the dielectric glass layers 13 and 23 is "$\epsilon$", and the amount of the electric charge on the dielectric glass layers 13 and 23 is "Q", capacitance "C" between the discharge electrode 12 and the address electrode 22 is represented by an Equation (1) given below.

$$C=\epsilon S/d \quad \text{Equation (1)}$$

Suppose that the voltage applied between the discharge electrodes 12 and the address electrode 22 is "V", the relation between the voltage "V" and the electric charge amount "Q" is represented by an Equation (2) below.

$$V=dQ/\epsilon S \quad \text{Equation (2)}$$

Note that the discharge spaces are in plasma condition at the time of discharge, so that the discharge spaces are conductive elements. In the Equations (1) and (2), when the dielectric glass layer thickness "d" is decreased, the capacitance "C" as a capacitor is increased and the discharge voltage at the time of addressing and display is decreased.

More specifically, even when the same level of the voltage "V" is applied, a larger amount of the electric charge "Q" is built up by decreasing the thickness of the dielectric glass layers 13 and 23, so that the capacitance may be increased and the discharge voltage may be decreased.

When only the thickness of the dielectric glass layers 13 and 23 is decreased, however, the voltage endurance is decreased. As a result, when an address pulse and a display pulse are applied, the dielectric glass layers are easy to break.

In the present invention, the approach to the improvement of the voltage endurance and the visible light transmittance is the determination of the average and maximum particle diameter of the glass powder in the dielectric glass layers 13 and 23.

The specific explanation of the manufacturing method of the PDP that has been described will be given below.

First, the explanation of how the front panel 10 is formed is given below.

On the surface of the front glass substrate 11, the discharge electrodes are formed in parallel according to the photolithographic method, which is well known in the art. Then, the dielectric glass layer is formed using a glass material to cover the discharge electrodes 12, which will be explained later in detail. On the surface of the dielectric glass layer 13, the protective layer 14 made of magnesium oxide (MgO) is formed.

The photolithographic method, in which the discharge electrode 12 is formed, will be briefly explained below.

Figure 4A:
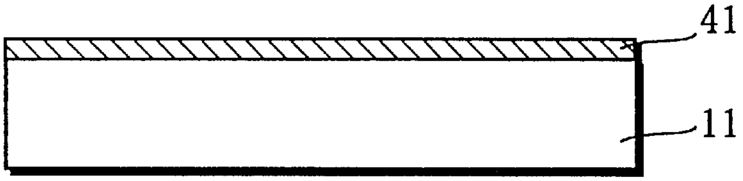
FIGS. 4A to 4E show the process of forming a discharge electrode according to a photolithographic method.
Figure 4B:
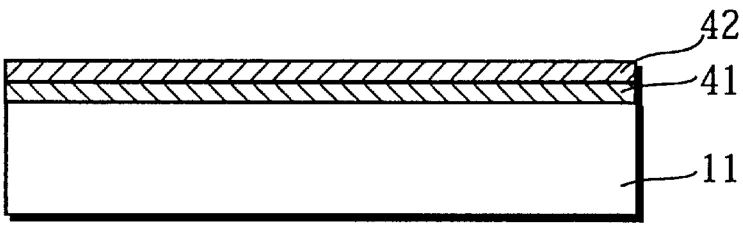
Figure 4C:
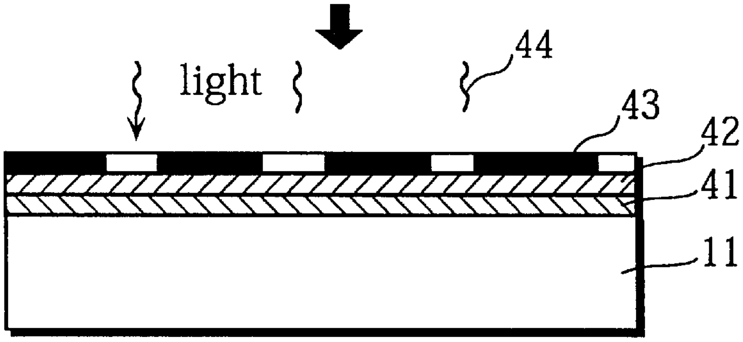
Figure 4D:
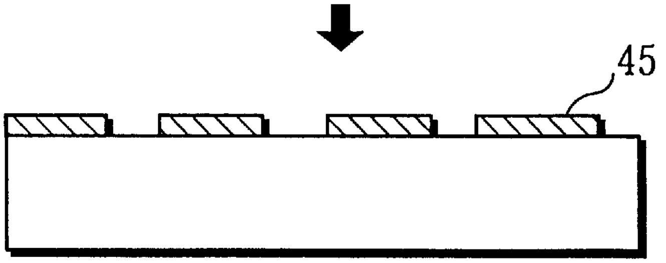
Figure 4E:
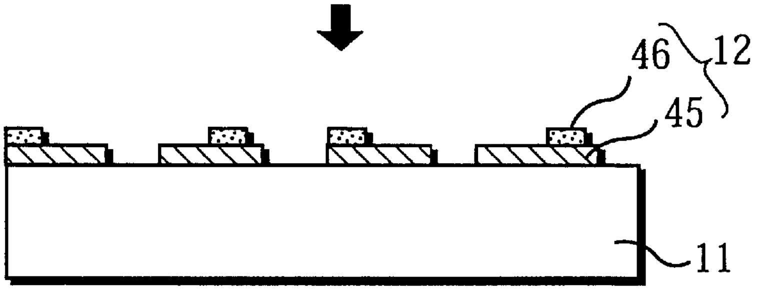

FIGS. 4A to 4E show the process of forming the discharge electrode 12 according to the photolithographic method. First, a predetermined thickness (for instance, 0.12 $\mu$m) of ITO layer 41, is formed by sputtering on the front glass substrate 11 as shown in FIG. 4A. Then, a photoregister layer 42 is formed as shown in FIG. 4B. As shown in FIG. 4C, light beams 44 are applied using masks 43, and a predetermined width (for instance, 150 $\mu$m) of ITO electrodes 45 are formed in parallel after development (the interval between the ITO electrodes 45 is, for instance, 50 $\mu$m) as shown in FIG. 4D. After that, a light-sensitive silver paste is applied across the surface as shown in FIG. 4E, and a predetermined width (for instance, 30 $\mu$m) of Ag bus lines 46 (metal electrodes) are formed on the ITO electrodes 45 (transparent electrodes) according to the photolithographic method. After a firing at a predetermined temperature, the discharge electrodes 12 are formed. When three-tier metal layers made of Cr-Cu-Cr are used as the bus lines (metal electrodes), the metal electrodes are formed in the manner given below. Each of the metal layers is vaporized in the sputtering on the transparent electrodes that have been formed by patterning as has been described. Resists are applied on the surface of the vaporized layers, and metal electrodes are formed by patterning according to the photolithographic method.

The explanation of how the protective layer 14 is formed by a CVD (Chemical Vapor Deposition) will be given below with reference to FIG. 5.

Figure 5:
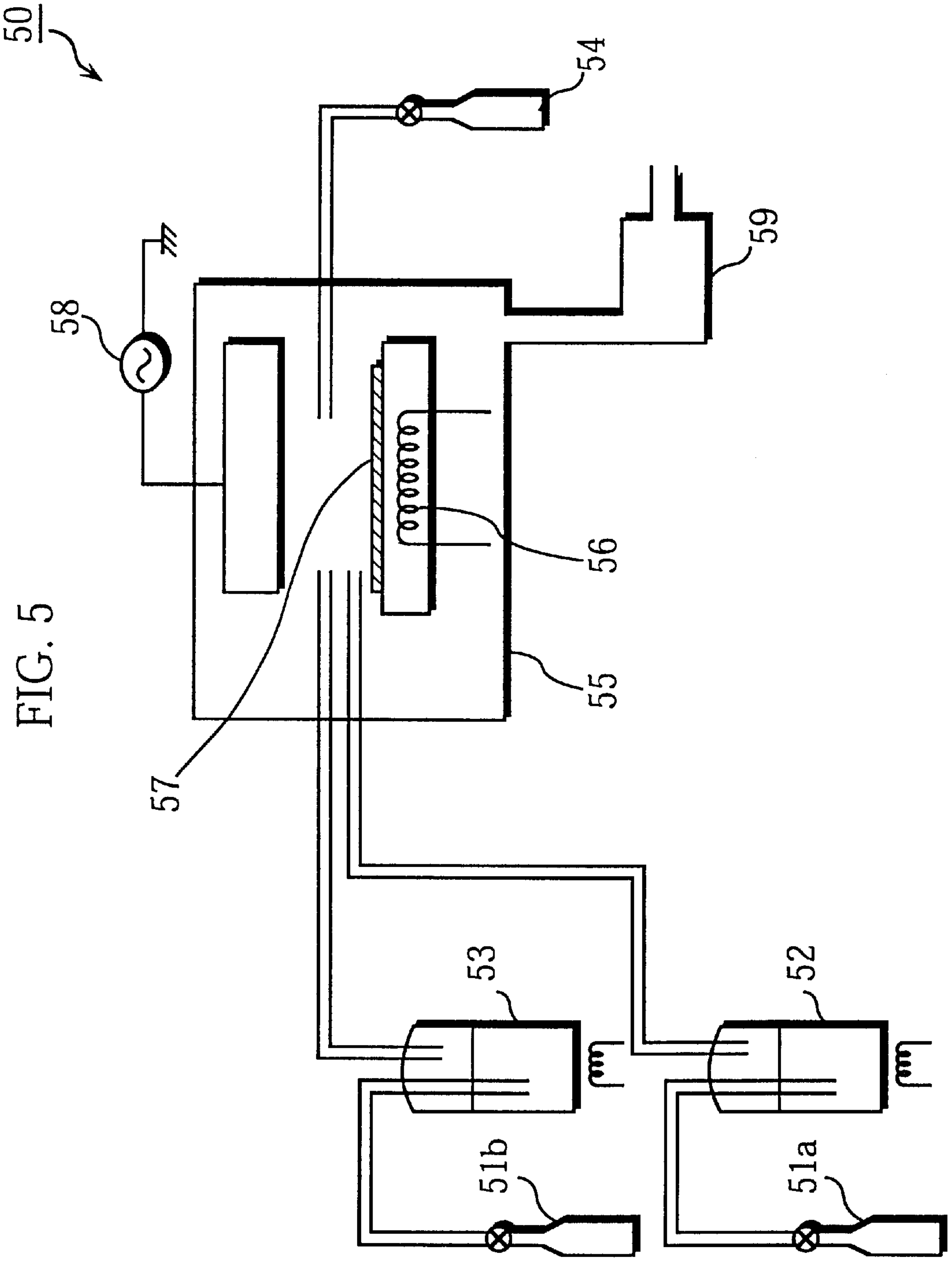
FIG. 5 is a schematic diagram of a CVD (Chemical Vapor Deposition) device used in forming a protective layer.

FIG. 5 is a schematic diagram of a CVD device 50 used in forming a protective layer 14.

The CVD device 50 performs a heat CVD and a plasma CVD. In a CVD device body 55, a heater 56 for heating a glass substrate 57 (the front glass substrate 11 on which the discharge electrode and the dielectric glass layer 13 are formed in FIG. 1) is included. The pressure in the CVD device body 55 is reduced by an exhaust device 59. A high-frequency power supply 58 for generating plasma in the CVD device body 55 is included in the CVD device 50.

Ar gas cylinders 51$a$ and 51$b$ provide the CVD device body 55 with argon [Ar] gas that is a carrier via vaporizers (bubblers) 52 and 53.

In each of the vaporizers 52 and 53, a magnesium compound is stored for forming the protective layer 14. More specifically, a metal chelate such as acetylacetone magnesium [$Mg(C_5H_7O_2)_2$], a cyclopentadienyl compound such as cyclopentadienyl magnesium [$Mg(C_5H_5)_2$], and an alkoxide compound is stored in the vaporizers 52 and 53.

An oxygen cylinder 54 provides the CVD device body 55 with oxygen [$O_2$] that is a reactant gas.

When the protective layer 14 is formed in the heat CVD, the glass substrate 57 is placed on the heater 56 with the side on which the electrodes have been formed up, and is heated at a predetermined temperature (about 30° C.). Meanwhile, the pressure in the CVD device body 55 is reduced (to about a several tens of Torr) by the exhaust device 59.

In the vaporizers 52 and 53, Ar gas is put from the Ar gas cylinder 51$a$ and 51$b$ while a source is heated to a predetermined vaporization temperature. Meanwhile, oxygen is provided by the oxygen cylinder 54 into the CVD device body 55.

The metal chelate, the cyclopentadienyl compound, or the alkoxide compound put into the CVD device body 55 is reacted to the oxygen that is also put into the CVD device body 55. As a result, on the surface of the glass substrate 57, on which electrodes have been formed, the protective layer 14 is formed.

In the plasma CVD, the protective layer 14 is formed in almost the same procedure using the CVD device. The plasma CVD differs from the heat CVD 58 in the points that the high-frequency power is driven and a high-frequency electric field (13.56 MHz) is applied. In the plasma CVD, the protective layer 14 is formed while plasma is caused in the CVD device body 55.

The back panel 20 is formed in the manner given below.

First, the address electrodes 22 are formed on the surface of the back glass substrate 21 according to the photolithographic method. Note that the address electrodes 22 are made of metal electrodes.

Then, the dielectric glass layer 23 is formed in the same manner as the front panel 10 so that the dielectric glass layer 23 covers the address electrodes 22. The forming of the dielectric glass layer 23 will be explained later in detail.

On the dielectric glass layer 23, walls 24 made of glass are placed at a predetermined interval.

In each of the spaces between the walls 24, differently colored phosphors of a red ("R") phosphor, a green ("G") phosphor, and a blue ("B") phosphor are arranged to form phosphor layers 25. Although the phosphor that is generally used for a PDP may be used, another kind of phosphor is used for the "R", "G", and "B" phosphors.

| | |
|---|---|
| Red phosphor: | $(Y_xGd_{1-x})\ BO_3{:}EU^{3+}$ |
| Green phosphor: | $Zn_2SiO_4{:}Mn$ |
| Blue phosphor: | $BaMgAl_{10}O_{17}{:}Eu^{2+}$<br>or<br>$BaMgAl_{14}O_{23}{:}Eu^{2+}$ |

An example of the method of forming the phosphors that are placed between the walls 24 will be given below with reference to FIG. 6.

Figure 6:
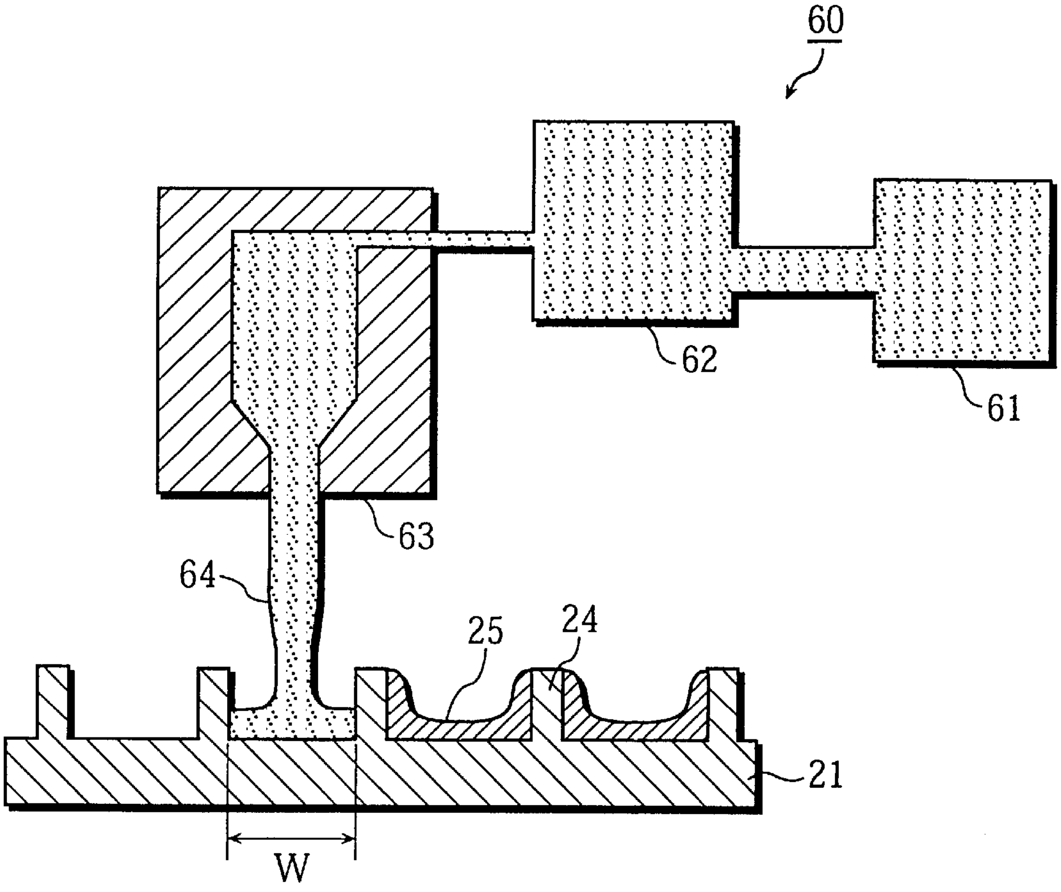
FIG. 6 is a schematic diagram of an ink coating device used in forming a phosphor layer.

FIG. 6 is a schematic diagram of an ink coating device 60 used in forming a phosphor layer. First, a phosphor mixture of a red phosphor $Y_2O_3$: $Eu^{3+}$powder, ethyl cellulose, and a solvent (α-terpineol) (the mixture ratio is 50 wt. %:1.0 wt. %:49 wt. %) having a predetermined particle diameter (for instance, the average particle diameter is 2.0 μm) is stirred using a sand mill in the server 61. Then, coating liquid having a predetermined viscosity (for instance, 15 cp) is added, and red-phosphor-forming liquid 64 is injected from the nozzle unit 63 (the diameter is 60 μm) of an injector at the pressure of a pump 62 into an interval between walls 24, which has forms of stripes. At that time, the substrate is moved straightly to form a red phosphor line 25. In the same manner a blue phosphor line ($BaMgAl_{10}O_{17}$: $Eu^{2+}$) and a green phosphor line ($Zn_2SiO_4$: Mn) are formed. Then, the red, blue, and green phosphor lines are fired at a predetermined temperature (for instance, at 500° C.) for a predetermined period of time (for instance, for 10 minutes) to form the phosphor layers 25.

The explanation of how forming the PDP by sticking the front panel 10 to the back panel 20 will be given below.

The front panel 10 is stuck to the back panel 20 using an attaching glass, the inside of the discharge spaces 30 divided by the walls 24 are exhausted to a high degree of vacuum ($8\times10^{-7}$ Torr). After that a predetermined composition of discharge gas is filled at a predetermined pressure to form a PDP.

Note that the cell size of the PDP in the present embodiment is set so that the cell size is suitable for a high-definition TV whose screen measures in the 40 inches. More specifically, the interval of the walls 24 is set to be equal to or smaller than 0.2 mm and the distance between the discharge electrodes 12 is set to be equal to or smaller than 0.1 mm.

Meanwhile, the discharge gas filled into the discharge spaces 30 is a He-Xe or a Ne-Xe gas that has been used. The composition, however, is set so that the content of Xe is equal to or more than 5 vol % and the infusion pressure is 500 to 760 Torr.

The explanation of how forming the dielectric glass layer 13 will be given below.

The dielectric glass layer 13 is formed on the surface of the front glass substrate 11 on which the discharge electrodes 12 have been formed according to the screen printing method, the die coating method, the spin coating method, the spray coating method, or the blade coating method using a glass powder the average particle diameter of which is 0.1 to 1.5 μm and the maximum particle diameter of which is equal to or smaller than three times the average particle diameter.

By using such a glass powder, a dielectric glass layer that is a solid sintered metal oxide that include a relatively small number of bubbles and has a relatively smooth surface may be obtained. Note that the particle diameters are measured using a Coulter counter grading analyzer (a particle size measuring instrument of Coulter K.K.), by which the number of particles are counted for each particle diameter (the Coulter Counter is also used in the examples given below).

The particle diameters are adjusted by crushing the glass raw material so that a predetermined particle diameter would be obtained using a crusher such as a ball mill and a jet mill (for instance, HJP300-02 of Sugino Machine Limited). When using the glass including the components G1, G2, G3, . . . , GN, as the glass raw material, the components G1, G2, G3, . . . , GN are weighed according to the component ratio, melted in a furnace at 1300° C., and put into water. The glass material is a $PbO-B_2O_3-SiO_2-CaO$ glass, a $PbO-B_2O_3-SiO_2-MgO$ glass, a $PbO-B_2O_3-SiO_2-BaO$ glass, a $PbO—B_2O_3—SiO_2—MgO—Al_2O_3$ glass, a $PbO—B_2O_3—SiO_2—BaO—Al_2O_3$ glass, a $PbO—B_2O_3—SiO_2—CaO—Al_2O_3$ glass, a $PbO—B_2O_3—ZnO—B_2O_3—SiO_2—CaO$ glass, a $ZnO—B_2O_3—SiO_2—Al_2O_3—CaO$ glass, a $P_2O_5—ZnO—Al_2O_3—CaO$ glass, an $Nb_2O_5—ZnO—B_2O_3—SiO_2—CaO$ glass, or the mixture of any of these glasses. Note that any glass that is generally used for a dielectric element may be also used.

As has been described, a predetermined particle diameter of glass powder is mixed well with a binder and a binder dissolution solvent in a ball mill, a dispersion mill, or a jet mill to form a mixed glass paste. Here, the binder is an acrylic resin, ethyl cellulose, ethylene oxide, or the mixture of any of them. The binder dissolution solvent is terpineol, butyl carbitol acetate, pentanediol, or the mixture of any of them. The viscosity of the mixed paste is set to be suitable for an adopted coating method by adjusting the amount of the binder dissolution solvent in the mixed paste.

To the mixed glass paste, a plasticizer or a surface active agent (dispersant) is favorably added as necessary. A plasticizer makes the dried glass coating, i.e., the dried printed glass paste pliant, reducing the frequency of the occurrence of cracks in the glass coating at the time of sintering. A surface active agent sticks around the particles and improves the degree of dispersion of the glass powder, resulting a smooth surface of a glass coating. As a result, adding of a surface active agent is effective especially to the die coating method, the spray coating method, the spin coating method, and the blade coating method, in which a glass paste with a relatively low viscosity is used.

Here, the favorable composition of the mixed glass paste is a 35 to 70 wt. % of glass powder and a 30 to 65 wt. % of binder ingredient including a 5 to 15 wt. % of binder. The amount of plasticizer and the surface active agent (dispersant) is favorably 0.1 to 3.0 wt. % of the binder ingredient.

The surface active agent (dispersant) is an anion surface active agent such as polycarboxylic acid, alkyl diphenyl ether sulfonic acid sodium salt, alkyl phosphate, phosphate salt of a high-grade alcohol, carboxylic acid of polyoxyethylene ethlene diglycerolboric acid ester, polyoxyethylene alkylsulfuric acid ester salt, naphthalenesulfonic acid formalin condensate, glycerol monooleate, sorbitan sesquioleate, and homogenol. The plasticizer is dibutyl phthalate, dioctyl phthalate, glycerol, or the mixture of any of them.

The mixed glass paste is printed according to the screen printing method, the die coating method, the spin coating method, the spray coating method, or the blade coating method on the front glass substrate 11 on the surface of which the discharge electrodes have been formed. The printed mixed glass paste is dried and the glass powder in the mixed glass paste undergoes sintering at a predetermined temperature (550 to 590° C.). The temperature of the sintering is as close as possible to the softening point of the glass. When the mixed glass paste undergoes sintering at a temperature too much higher than the softening point of the glass, the melted glass flows so well that the glass reacts to the discharge electrodes, resulting the frequent occurrence of bubbles in the dielectric glass layer.

As the dielectric glass layer is thinner, the intensity of the PDP is more improved and the discharge voltage is more reduced. As a result, the thickness of the dielectric glass layer is set as small as possible as long as the voltage endurance is kept. In the present embodiment, the thickness of dielectric glass layer 13 is set at a predetermined value smaller than 20 μm that is the thickness of a conventional dielectric glass layer.

The explanation of the printing of the mixed glass paste using the screen printing method, the die coating method, the spin coating method, the spray coating method, and the blade coating method will be given below.

First, the screen printing method will be explained. In the screen printing method, the mixed glass paste that has been described (the viscosity of which is about 50,000 cp) is placed on a stainless mesh of a predetermined mesh size (for instance, 325 mesh), and is printed using a squeegee so that the thickness of the printed mixed glass paste is a desired thickness.

Then, the die coating method will be explained.

Figure 7:
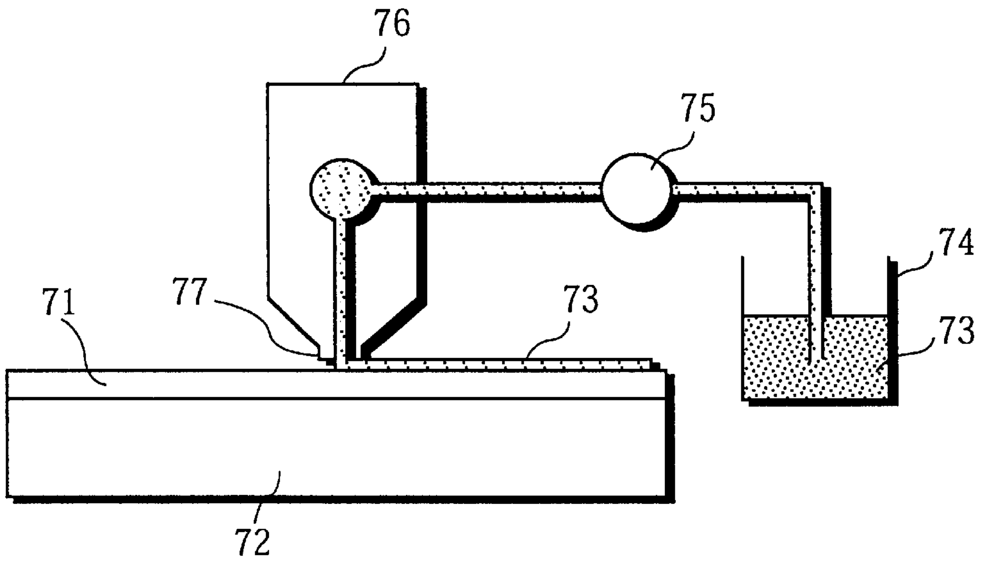
FIG. 7 is a schematic diagram of a die coater used in forming a dielectric glass layer.

FIG. 7 is a schematic diagram of a die coater used in forming a dielectric glass layer. A front glass substrate 71 on which discharge electrodes have been formed is placed on a table 72. A glass paste 73 the viscosity of which has been adjusted to be equal to or smaller than 50,000 cp is put in a tank 74. The glass paste 73 is guided by a pump 75 to a slot die 76 and is delivered from a head nozzle 77, coating the substrate. The distance between the head nozzle 77, the viscosity of the glass paste 73, the number of coating (the thickness of a glass paste layer formed by one coating is 5 to 100 μm), and the like are adjusted so that a desired thickness of glass paste layer is obtained.

The spray coating method will be explained.

Figure 8:
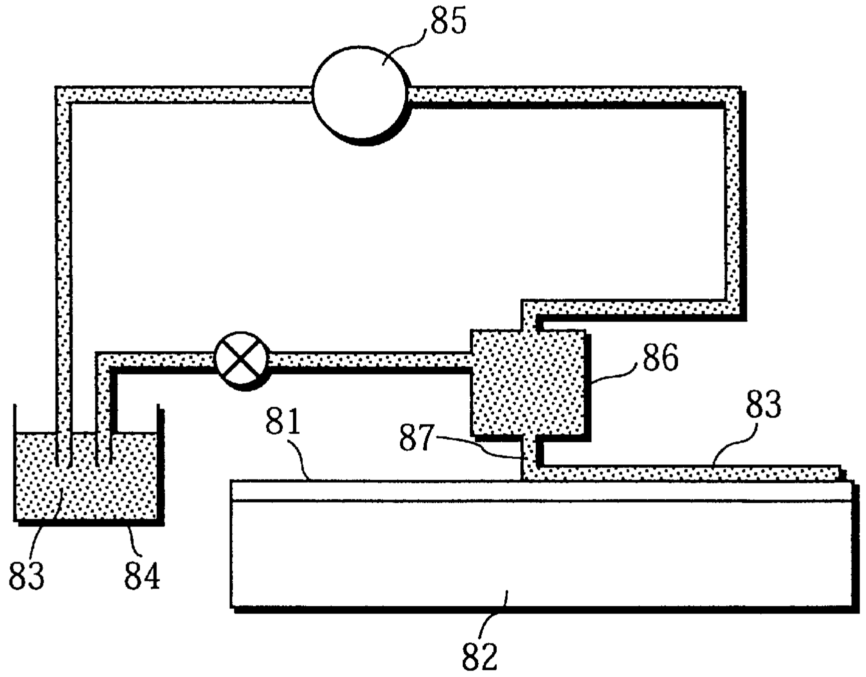
FIG. 8 is a schematic diagram of a spray coater used in forming a dielectric glass layer.

FIG. 8 is a schematic diagram of a spray coater used in forming a dielectric glass layer. A front glass substrate 81 on which discharge electrodes have been formed in placed on a table 82. A glass paste 83 the viscosity of which has been adjusted to be equal to or lower than 10,000 cp is put in a tank 84. The glass paste 83 is guided by a pump 85 to a spray gun 86 and is spouted from a nozzle 87 (the insider diameter of which is 100 μm), coating the front panel 81 so that the thickness of a glass paste layer is a desired thickness. The thickness of the glass powder layer is controlled by adjusting the viscosity of the glass paste 83, the spray pressure, the number of coating (the thickness of the glass paste layer formed by one coating is 0.1 to 5 μm), and the like.

Note that while a glass paste changes into a slurry as the viscosity is decreased, a glass paste is referred to as a paste even when the viscosity is decreased in this specification.

Then, the spin coating method will be explained.

Figure 9:
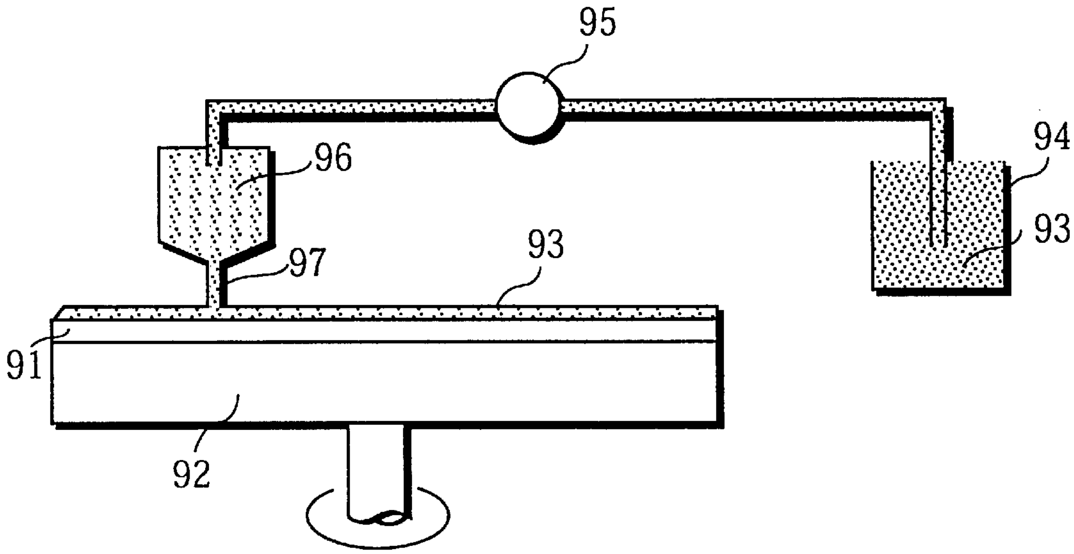
FIG. 9 is a schematic diagram of a spin coater used in forming a dielectric glass layer.

FIG. 9 is a schematic diagram of a spin coater used in forming a dielectric glass layer. A front glass substrate 91 on which discharge electrodes have been formed is placed on a table 92, which rotates about a vertical axis. A glass paste 93 the viscosity of which has been adjusted to be equal to or lower than 10,000 cp is put in a tank 94. The glass paste 93 is guided by a pump 95 to a spin coat gun 96 and is delivered from a nozzle 97, coating the front panel 91 so that the thickness of a glass paste layer is a desired thickness. The thickness of the glass paste layer is controlled by adjusting the viscosity of the glass paste 93, the rotation speed of the table 92, the number of coating (the thickness of the glass paste layer formed by one coating is 0.1 to 5 μm), and the like.

Next, the blade coating method will be explained.

Figure 10:
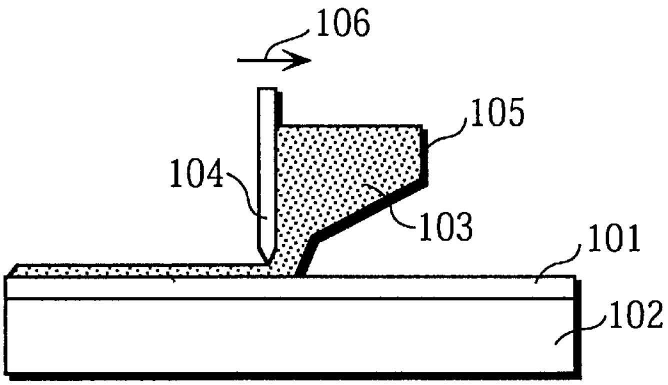
FIG. 10 is a schematic diagram of a blade coater used in forming a dielectric glass layer.

FIG. 10 is a schematic diagram of a blade coater used in forming a dielectric glass layer. A front glass substrate 101 on which discharge electrodes have been formed is placed on a table 102. A glass paste 103 the viscosity of which has been adjusted to be equal to or lower than 15,000 cp is put in a tank 105, which is equipped with a blade 104. The tank 105 is drawn in the direction of an arrow 106 and a certain amount of the glass paste 103 is delivered from the blade 104 on the glass substrate so that a predetermined thickness of glass paste layer is applied on the glass substrate. The thickness of the glass paste layer is controlled by adjusting the viscosity of the glass paste 103, the distance between the blade and the glass substrate, the number of glass paste layer application, and the like.

Here, the screen printing method, the die coating method, the spin coating method, the spray coating method, and the blade coating method are compared with each other. In the screen printing method, a paste (ink) the viscosity of which is relatively high is used, i.e., an ink that is easy to flow is used. As a result, the mesh pattern is left on the surface of a printed dielectric element at the time of drying after the printing, generating an uneven dielectric glass layer surface (refer to "*Saishin Purazuma Disupurei Seizo-Gijutsu, Gekkan FPD Interijensu* (Latest Plasma Display Manufacturing Method, Monthly FPD Intelligence)" December issue, 1997, p105). In the present embodiment, the glass material in which the average particle diameter of the glass powder is 0.1 to 1.5 μm and the maximum particle diameter is equal to or smaller than three times the average particle diameter is used in the screen printing method. As a result, the unevenness on the surface of the dielectric glass layer appears less frequently and the visible light transmittance is improved compared with when using a conventional glass material in which the average particle diameter is equal to or larger than 2 μm. Even so, however, the mesh pattern is still left, so that the screen printing method is susceptible to improvement.

On the other hand, the glass paste has a relatively low viscosity, i.e., the glass paste is easy to flow, and no mesh is used in the die coating method, the spin coating method, the spray coating method, and the blade coating method. As a result, no mesh pattern is left on the surface of the dielectric element, resulting smoother surface and the more improved visible light transmittance compared with in the screen printing method. Consequently, the die coating method, and the blade coating method is more suitable as a method of forming a dielectric glass layer.

The explanation of how the dielectric glass layer 23 is formed will be given below.

The dielectric glass layer 23 in the same manner as the dielectric glass layer 13 using a glass powder in which 5 to 30 wt. % of $TiO_2$ is added to the glass powder that has been used in forming the dielectric glass layer 13. By adding the $TiO_2$, the dielectric glass layer 23 on the back glass substrate 21 reflects the light emitted from a phosphor toward the front panel 10.

The more the $TiO_2$ is included in a glass powder, the higher the reflectivity. On the other hand, the more the $TiO_2$ is included, the more the voltage endurance decreases. As a result, the maximum amount of the $TiO_2$ is 30 wt % of the dielectric glass material.

In addition, a greater amount of $TiO_2$ effects the appearance of bubbles in the dielectric glass layer, so that it is favorable to use a glass powder in which the average particle diameter is 0.1 to 1.5 μm and the maximum particle diameter is equal to or smaller than three times the average particle diameter. It is more favorable to use a glass powder in which the average particle diameter is 0.1 to 0.5 μm.

The reason why the frequency of the bubble appearance in a dielectric glass layer is decreased when the particle diameter of the glass material is decreased will be given below.

First, the reason why the frequency of the bubble appearance depends on the diameter of the glass material will be explained.

In a glass material, glass particles with relatively small diameters melt earlier than those with relatively large diameters. When an applied glass layer includes glass particles with different diameters, by the end of the sintering, glass particles with relatively small diameters melt and flocculate due to the fluidity, having no gap which gas passes through. At this time, when larger diameter particles do not melt, gas is left in the interstices among these larger diameter particles. As a result, because of the melting speed difference between the glass particles, the interstices among relatively large diameter particles are left as bubbles after sintering. As has been descirbed, bubble appearance depends on the particle diameter of a glass powder, i.e., there is a high correlation between the particle diameters of a glass powder and the diameters of the bubbles appearing in a glass layer. As a result, the frequency of the bubble appearance in the glass layer is decreased by setting the glass powder average particle diameter at 0.1 to 1.5 μm and the maximum particle diameter to be equal to or smaller than three times the average particle diameter as in the present embodiment. Note that even when the particle diameter is set as has been described, glass particles with relatively small diameters melt earlier than those with relatively large diameters, so that the glass particles that melt earlier flocculate earlier due to the fluidity by the end of the sintering. In this case, however, the melting speed difference is small. As a result, the frequency of bubble appearance is decreased. The phenomena is confirmed by the experiences given later.

In addition, the surface of the front and back glass substrates 11 and 21 after the forming of the discharge electrodes 12 and the address electrodes 22 is uneven anyway. Especially when the discharge electrodes 12 and the address electrodes 22 are formed according to the photolithographic method, large projections are formed on the surface. Since dielectric glass layers are formed on the surface, on which the projections of the discharge electrodes 12 and the address electrodes 22 have been formed, bubbles remain in depressions. This is also a cause of bubble appearance in a dielectric glass layer. In the present embodiment, the average particle diameter of the glass material is 0.1 to 1.5 μm. The average diameter is smaller than that of a conventional glass material, i.e., 2 to 15 μm. In other words, the glass material in the present embodiment includes a greater amount of small diameter glass particles. As a result, the probability is higher that small diameter particles fill the depressions to decrease the frequency of bubble appearance in the depressions.

The explanation of how different the melting speed of glass materials with different particle diameters will be given below according to a specific data.

Figure 11:
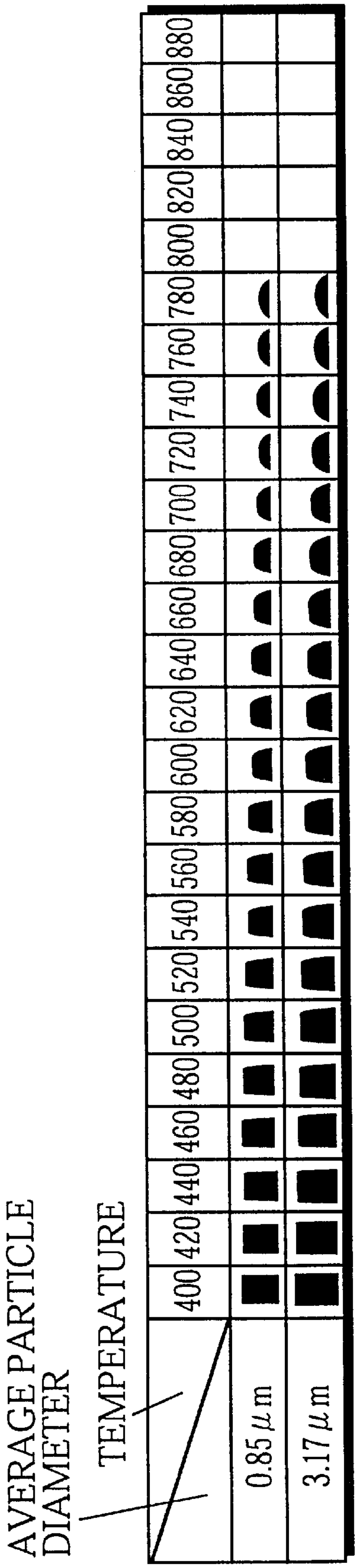
FIG. 11 is a table showing the relations between the melting speeds and the average particle diameters of glass materials.

FIG. 11 is a table showing the relations between the melting speeds and the average particle diameters of glass materials. Glass materials with the average diameter of 0.85 μm and 3.17 μm are formed into a predetermined size of circular cylinders by the application of pressure. These circular cylinders are heated at a rate of heating 10° C./min and the photographs of the circular cylinders are taken every time the temperature increases 20° C. from 400 to 800° C. using a heating microscope. The black pictures represent the circular cylinders. As clearly shown in FIG. 11, the melting speed of the circular cylinder of the glass material of smaller diameter particles is larger than that of the larger diameter particles at the same temperature. The experiment is described in detail in "*Denki Kagaku* (Electrochemical)" (Vol. 56, No.1, 1998, pp23–24).

As has been descirbed, the frequency of bubble appearance is decreased, a certain level of voltage endurance is secured even when the dielectric glass layers 12 and 23 are set thinner in the present embodiment. More specifically, even when the thickness of the dielectric glass layers 13 and 23 are set to be equal to or smaller than 20 μm to increase the intensity, the decrease of the voltage endurance due to a thinner thickness is prevented. As a result, the effects of improving the panel intensity and decreasing the discharge electrode are obtained at the same time.

In addition, when the dielectric glass layers 13 and 23 are set thinner, the voltage endurance is sufficiently secured. As a result, an outstanding initial performance such as higher panel intensity and a lower discharge voltage may be maintained for a relatively long period of time even when the PDP is used frequently, making the PDP a reliable, superior one.

Furthermore, formed using relatively small glass particles, the dielectric glass layers 13 and 23 have highly smooth surfaces. As a result, the dielectric glass layers 13 and 23 have a relatively high visible light transmittance.

Note that while a relatively fine glass powder is used in forming a dielectric glass layer for both of the front and back panels 10 and 20 in the present embodiment, the relatively fine glass powder may be used only for one of the front and back panels 10 and 20. In addition, when a dielectric glass layer is formed only on the side of the front panel 10 in a PDP, the relatively fine glass powder may be used only for the front panel 10.

The explanation of specific experiments shown as examples (1) and (2) will be given below.

EXAMPLE (1)

(Table 1)
(Table 2)
(Table 3)
(Table 4)

Tables 1 and 2 show the conditions concerning the forming of the dielectric glass layer 13 on the side of the front panel 10 (glass composition, average particle diameter, glass paste composition, firing temperature, and the like). Tables 3 and 4 show the conditions concerning the forming of the dielectric glass layer 23 on the side of the back panel 20 (glass composition, average particle diameter, glass paste composition, firing temperature, and the like).

In the example (1), dielectric glass layers are formed using the test samples Nos. 1 to 14 on Tables 1 to 4 according to the screen printing method.

In the PDPs corresponding to the test samples Nos. 1 to 6, and 9 to 12, the surfaces of the discharge electrodes 12 and the address electrodes 22 are covered by the dielectric glass layers 13 and 23 formed using the glass powder in which the average particle diameter is 0.1 to 1.5 μm and the maximum particle diameter is equal to or smaller than three times the average particle diameter according to the foregoing embodiment. The thickness of the dielectric glass layers 13 and 23 is 10 to 15 μm (on average).

Here, the cell size of the PDP will be given below. For a high-definition TV having a screen that measures 42 inches, the height of the walls 24 is set to be 0.15 mm, the interval between the walls 24, i.e., the cell pitch is set to be 0.15 mm, and the interval between the discharge electrodes 12 is set to be 0.05 mm. An Ne—Xe mixed gas including 5 vol % of Xe is filled into the discharge spaces 30 at the infusion pressure of 600 Torr.

The protective layer 14 is formed according to the plasma CVD method. In the plasma CVD method, acetylacetone magnesium [$Mg(C_5H_2O_2)_2$] or magnesium dipivaloylmethane [$Mg(C_{11}H_{19}O_2)_2$] is used as the source.

The conditions in the plasma CVD method are given below. The temperature of the vaporizers is set to be 125° C.

and the temperature to heat the glass substrate is set to be 250° C. One liter of Ar gas and two liters of oxygen are applied on a glass substrate per minute. The pressure is decreased to 10 Torr, and 13.56 MHz high-frequency electric field at 300 W is applied from a high-frequency power for 20 seconds. The MgO protective 14 is formed so that the thickness is to be 1.0 μm. The speed in forming the protective layer 14 is 1.0 μm/minute.

An X-ray analysis shows that the crystal face of the protective layer 14 orientates to (100) face for all of the test samples when using either of $Mg(C_5H_7O_2)_2$ and $Mg(C_{11}H_{19}O_2)_2$ as the source. Note that the protective layer 14 is formed according to the plasma CVD method. The characteristics of the PDPs are almost the same when the material gas used in the plasma CVD method is acetylacetone magnesium or magnesium dipivaloylmethane.

For the dielectric glass layer 13 on the side of the front panel 10, while a $PbO—B_2O_3—SiO_2—CaO—Al_2O_3$ dielectric glass is used in the PDPs corresponding to the test samples Nos. 1 to 8, a $PbO—B_2O_3—SiO_2—CaO—Al_2O_3$ dielectric glass is used in the PDPs corresponding to the test samples Nos. 9 to 14.

For the dielectric glass layer 23 on the side of the back panel 20, a glass material in which titanium oxide is added to a $PbO—B_2O_3—SiO_2—CaO$ dielectric glass as the filler.

The PDPs corresponding to the test samples Nos. 7, 8, 13, 14 are comparative examples. In the test samples Nos. 7, 8, 13, 14, the dielectric glass powders used for forming the dielectric glass layers 13 and 23 have the characteristics given below. On the side of the front panel 10, the average particle diameter is 3.0 μm and the maximum particle diameter is 6.0 μm in the test sample No. 7, the average particle diameter is 1.5 μm and the maximum particle diameter is 6.0 μm (four times the average particle diameter) in the test sample No. 8, the average particle diameter is 3.0 μm and the maximum particle diameter is 9.0 μm in the test sample No. 13, and the average particle diameter is 1.5 μm and the maximum particle diameter is 6.0 μm (four times the average particle diameter) in the test sample No. 14. On the side of the back panel 20, the average particle diameter is 3.0 μm and the maximum particle diameter is 9.0 μm in the test sample No. 7, the average particle diameter is 1.5 μm and the maximum particle diameter is 6.0 μm (four times the average particle diameter) in the test sample No. 8, the average particle diameter is 3.0 μm and the maximum particle diameter is 9.0 μm in the test sample No. 13, and the average particle diameter is 1.5 μm and the maximum particle diameter is 6.0 μm (four times the average particle diameter) in the test sample No. 14.

Experiment 1

For each of the PDPs corresponding to the test samples Nos. 1 to 14, the sizes of the bubbles in the dielectric layers on the discharge electrodes and the address electrodes are examined by an electron microscope (the magnification is 1000 times), and the average bubble diameter is obtained from the measurement of the diameters of a predetermined number of bubbles. The diameter of one bubble is the average of the measurements of two axes.

Experiment 2

A withstand voltage test is performed for each of the PDPs corresponding to the test samples Nos. 1 to 14 in the manner given below. Before the sealing of the panel, the front panel 10 (the back panel 20) is removed, and the discharge electrodes 12 (the address electrodes 22) is set to be the anode. A silver paste is printed on the dielectric glass layer 13 (the dielectric glass layer 23), and the printer silver paste is set to be the cathode after being dried. A voltage is placed between the anode and the cathode, and the voltage when the electrical breakdown occurs is determined as the withstand voltage.

In addition, the panel intensity ($cd/cm^2$) is obtained for each of the PDPs from the measurement when the PDP is discharged with a discharge maintaining voltage of about 150 V and at a frequency of 30 kHz.

Experiment 3

20 PDPs are manufactured for each of the PDPs corresponding to the test samples Nos. 1 to 14, and a acceleration life test is performed for each of the manufactured PDPs. The acceleration life test is performed under a significantly severe condition, i.e., the PDPs are discharged with a discharge maintaining voltage 200 V at a frequency of 50 kHz for four consecutive hours. After the discharge, the breaking conditions of the dielectric glass layers and the like in the PDPs (voltage endurance defects of the PDPs) are checked.

The results of the experiments 1 to 3 are shown on Tables 5 and 6 given below.

(Table 5)

(Table 6)

Experiment 4

Figure 12:
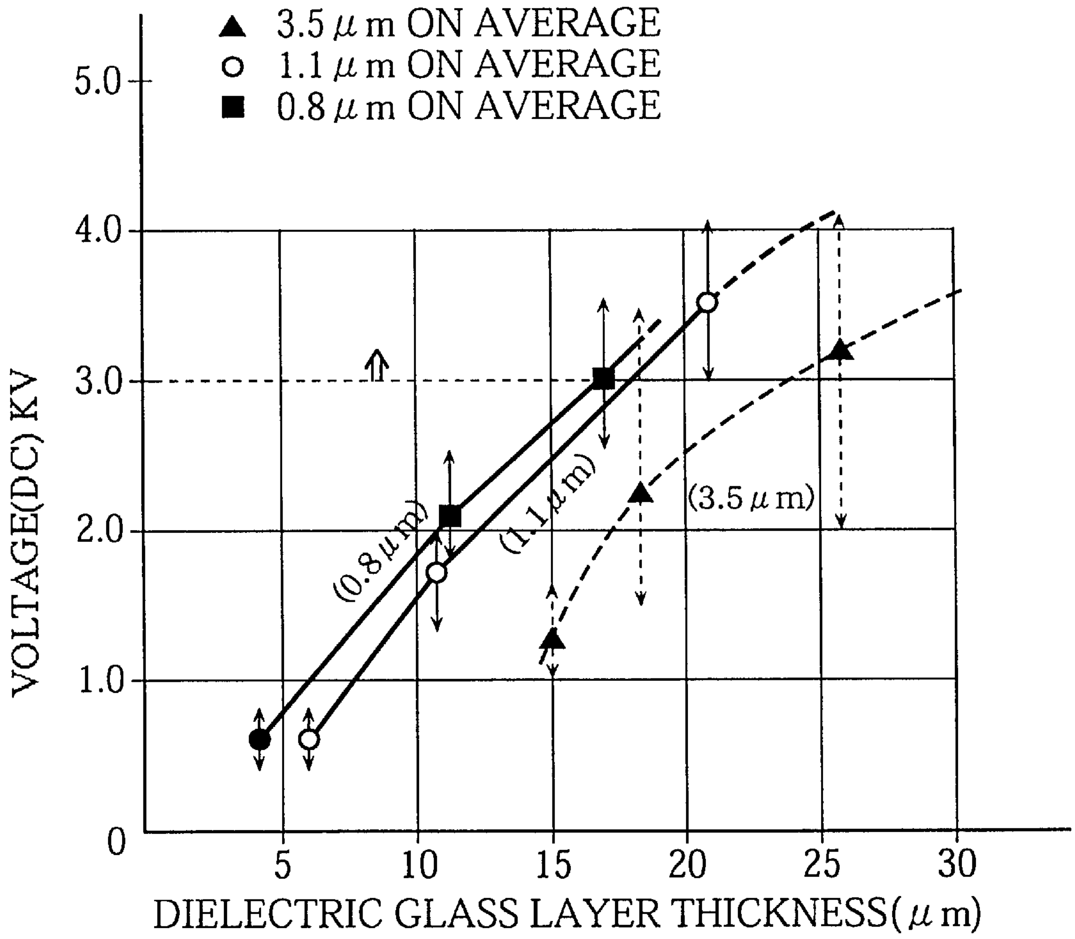
FIG. 12 shows the relations between thickness and voltage endurance of dielectric glass layer.
Figure 13:
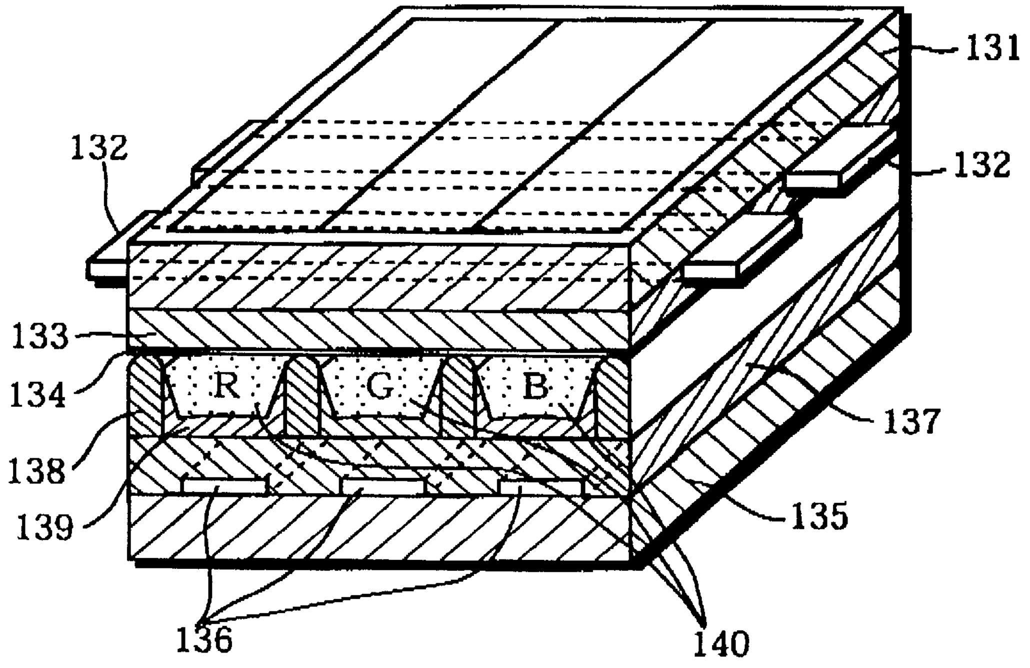
FIG. 13 is a perspective view of the essential part of a conventional ac plasma display panel.

In the experiment 4, the voltage endurance of dielectric glass layers are measured. The dielectric glass layers have different thickness equal to or smaller than 30 μm and have been formed using the glass materials in which the average particle diameters of the glass powders are 3.5 μm, 1.1 μm, and 0.8 μm. The relation between the thickness of dielectric glass layer and the voltage endurance is shown in FIG. 12 according to the experimental results.

Study

The experimental results on Tables 5 and 6 show that the PDPs corresponding to the test samples Nos. 1 to 6, and 9 to 12 have superior panel intensities compared with a conventional PDP, the panel intensity of which is about 400 $cd/m^2$ (described in "Flat-Panel Display" 1997, p198).

The observation of the bubble sizes, and the results of the withstand voltage test of the dielectric glass layers and the acceleration life test of the PDPs show that the PDPs corresponding to the test samples Nos. 1 to 6, and 9 to 12 including the dielectric glass layers that have been formed using the glass materials in which the average particle diameter of the glass powder is 0.1 to 1.5 μm and the maximum particle diameter is smaller than three times the average particle diameter are superior in voltage endurance compared with the PDPs corresponding to the test samples 7, 8, 13, and 14 including the dielectric glass layers that have been formed using the glass materials in which the average particle diameter of the glass powder is equal to or larger than 1.5 μm or the glass materials in which the average particle diameter of the glass powder is equal to or smaller than 1.5 μm and the maximum particle diameter is more than three times the average particle diameter.

As a result, coating of the discharge electrodes and the address electrodes by the dielectric glass layer that has been formed using a glass powder in which the average particle diameter is 0.1 to 1.5 μm and the maximum particle diameter is smaller than three times the average particle diameter may improve the voltage endurance even when the thickness of the dielectric glass layer is set to be smaller than 20 μm, i.e., even if the dielectric glass layer is thinner than a conventional one so that an improved intensity is obtained.

Note that the dielectric glass layers formed using the glass powder the average particle diameter of which is set to be equal to or larger than 3 μm for the PDPs corresponding to the test samples Nos. 7 and 13, and the dielectric glass layers formed using the glass powder the average particle diameter of which is set to be 1.5 μm and the maximum particle diameter of which is set to be larger than three times the average particle diameter are easy to have electrical breakdown even though these dielectric layers on the discharge electrodes and the address electrodes are thicker than those in the PDPs corresponding to the test samples Nos. 1 to 6, and 9 to 12.

As has been described, FIG. 12 shows that the voltage endurance increases as the size of the average particle diameter of the glass material decreases when the thickness of dielectric glass layer is the same.

In other words, when the voltage endurance is the same, the thickness of dielectric layer decreases as the size of the average particle diameter decreases. As a result, a smaller glass material average diameter realizes a higher intensity with the same voltage endurance.

EXAMPLE (2)

(Table 7)

(Table 8)

(Table 9)

(Table 10)

(Table 11)

(Table 12)

(Table 13)

(Table 14)

(Table 15)

(Table 16)

In the PDPs corresponding to the test samples Nos. 1 to 6, 9 to 12, 15 to 20, 23 to 28, and 31 to 34 on Tables 7 to 16, the discharge electrodes and the address electrodes are covered by dielectric glass layers. The dielectric glass layers are formed by applying a glass paste on the glass substrates according to the die coating method, the spray coating method, the spin coating method, or the blade coating method and by firing the applied glass paste. The glass paste includes a binder component including a plasticizer and a surface active agent, and the glass powder the average particle diameter of which is 0.1 to 1.5 μm and the maximum particle diameter of which is equal to or smaller than three times the average particle diameter. The thickness of the dielectric glass layers is set to be 10 to 15 μm (on average).

The cell size of the PDPs is set for the high-definition TV display that measures 42 inches. The height of the walls 24 is set to be 0.15 mm, the interval between the walls 24, i.e., the cell pitch is set to be 0.15 mm, and the interval between the discharge electrodes 12 is set to be 0.05 mm. An Ne—Xe mixed gas including 5 vol % of Xe is filled into the discharge spaces 30 at the infusion pressure of 600 Torr.

The protective layer 14 is formed using acetylacetone magnesium [$Mg(C_5H_7O_2)_2$] or magnesium dipivaloylmethane [$Mg(C_{11}H_{19}O_2)_2$] as the source according to the plasma CVD method that has been described.

An X-ray analysis shows that the crystal face of the protective layer 14 orientates to (100) face for all of the test samples when either of $Mg(C_5H_7O_2)_2$ and $Mg(C_{11}H_{19}O_2)_2$ is used as the source.

In each of the PDPs corresponding to the test samples Nos. 1 to 8, the dielectric glass layer on the side of the front panel is formed using a $PbO—B_2O_3—SiO_2$-$CaO—Al_2O_3$ dielectric glass. In the PDPs corresponding to the test samples Nos. 9 to 14, the dielectric glass layer is formed using a $Bi_2O_3—ZnO—B_2O_3—SiO_2—CaO$ dielectric glass. In the PDPs corresponding to the test samples Nos. 15 to 22, a $ZnO—B_2O_3—SiO_2—Al_2O_3—CaO$ dielectric glass is used. In the PDPs corresponding to the test samples Nos. 23 to 30, a $P_2O_5—ZnO—Al_2O_3—CaO$ dielectric glass is used. In the PDPs corresponding to the test samples Nos. 31 to 36, an $Nb_2O_5—ZnO—B_2O_3—SiO_2—CaO$ dielectric glass is used. In each of the PDPs, the dielectric glass layer on the side of the back panel is formed using the mixture of titanium oxide and the dielectric glass that is almost the same as used for the dielectric glass layer on the side of the front panel.

In each of the PDPs corresponding to the test samples Nos. 1 to 3, 9, 10, 15 to 17, 23 to 25, 31, and 32, the dielectric glass layer is formed according to the die coating method, and the glass paste is adjusted so that the viscosity is 20,000 to 50,000 cp.

In the PDPs corresponding to the test samples Nos. 4, 12, 19, 27, 28 and 34, the dielectric glass layer is formed according to the spray coating method, and the glass paste is adjusted so that the viscosity is 500 to 20,000 cp.

In the PDPs corresponding to the test samples Nos. 5, 11, 18, 26, and 33, the spin coating method is used, and the glass paste is adjusted so that the viscosity is 100 to 3,000 cp.

In the PDPs corresponding to the test samples Nos. 6 and 20, the blade coating method is used, and the glass paste is adjusted so that the viscosity is 2,000 to 10,000 cp.

The dielectric glass layers on the address electrodes are all formed according to the die coating method.

The PDPs corresponding to the test samples Nos. 7, 8, 13, 14, 21, 22, 29, 30, 35, and 36 are comparative examples. In these PDPs, the dielectric glass layers are formed according to the screen printing method, and the particle diameters of the dielectric glass powders used for the dielectric layers are set to be as given below. On the side of the front panel, the average particle diameter is 3.0 μm and the maximum particle diameter is 6.0 μm in the PDP corresponding to the test samples No. 7, the average particle diameter is 1.5 μm and the maximum particle diameter is 6.0 μm (four times the average particle diameter) in the No.8 PDP, the average particle diameter is 3.0 μm and the maximum particle diameter is 9.0 μm in the No. 13. PDP, the average particle diameter is 1.5 μm and the maximum particle diameter is 6.0 μm (four times the average particle diameter) in the No. 14 PDP, the average particle diameter is 3.0 μm and the maximum particle diameter is 6.0 μm in the No. 21 PDP, the average particle diameter is 1.5 μm and the maximum particle diameter is 6.0 μm (four times the average particle diameter) in the No. 22 PDP, the average particle diameter is 3.0 μm and the maximum particle diameter is 6.0 μm in the No. 29 PDP, the average particle diameter is 1.5 μm and the maximum particle diameter is 6.0 μm in the No. 30 PDP, the average particle diameter is 3.0 μm and the maximum particle diameter is 9.0 μm in the No. 35 PDP, and the average particle diameter is 1.5 μm and the maximum particle diameter is 6.0 μm (four times the average particle diameter) in the No. 36 PDP. On the side of the back panel, the average particle diameter is 3.0 μm and the maximum particle diameter is 6.0 μm in the No. 7 PDP, the average particle diameter is 1.5 μm and the maximum particle diameter is 6.0 μm (four times the average particle diameter) in the No. 8 PDP, the average particle diameter is 3.0 μm and the maximum particle diameter is 9.0 μm in the No. 13 PDP, the average particle diameter is 1.5 μm and the maximum particle diameter is 6.0 μm (four times the average particle diameter) in the No. 14 PDP, the average particle diameter is 3.0 μm and the maximum particle diameter is 6.0 μm in the No. 21 PDP, the average particle diameter is 1.5 μm and the maximum particle diameter is 6.0 μm (four times the average particle diameter) in the No. 22 PDP, the average particle diameter is 3.0 μm and the maximum particle diameter is 7.0 μm in the No. 29 PDP, the average particle diameter is 1.5 μm and the maximum particle diameter is 6.5 μm in the No. 30 PDP, the average particle diameter is 3.0 μm and the maximum particle diameter is 9.0 μm in the No. 35 PDP, and the average particle diameter is 1.5 μm and the maximum particle diameter is 6.0 μm (four times the average particle diameter) in the No. 36 PDP.

Experiment 1

For each of the PDPs corresponding to the test samples Nos. 1 to 14, the sizes of the bubbles in the dielectric layers on the discharge electrodes and the address electrodes are examined by an electronic microscope (the magnification is 1000 times), and the average bubble diameter is obtained from the measurement of the diameters of a predetermined number of bubbles. The diameter of one bubble is the average of the measurements of two axes.

Experiment 2

A withstand voltage is performed for each of the PDPs corresponding to the test samples Nos. 1 to 14 in the manner given below. Before the sealing of the panel, the front panel 10 (the back panel 20) is removed, and the discharge electrodes 12 (the address electrodes 22) is set to be the anode. A silver paste is printed on the dielectric glass layer 13 (the dielectric glass layer 23), and the printed silver paste is set to be the cathode after being dried. A voltage is placed between the anode and the cathode, and the voltage when the electrical breakdown occurs is determined as the withstand voltage. The panel intensity (cd/cm$^2$) is obtained for each of the PDPs from the measurement when the PDP is discharged with a discharge maintaining voltage of about 150 V and at a frequency of 30 kHz.

Experiment 3

20 PDPs are manufactured for each of the PDPs corresponding to the test samples Nos. 1 to 36, and a acceleration life test is performed for each of the manufactured PDPs. The acceleration life test is performed under a condition significantly severer than a usual condition, i.e., the PDPs are discharged with a discharge maintaining voltage 200 V at a frequency of 50 kHz for four consecutive hours. After the discharge, the breaking conditions of the dielectric glass layers and the like in the PDPs (voltage endurance defects of the PDPs) are checked. The results of the experiments 1 to 3 are shown in Tables 17 to 21 given below.

(Table 17)

(Table 18)

(Table 19)

(Table 20)

(Table 21)

Study

The experimental results on Tables 17 to 21 show that the PDPs corresponding to the test samples Nos. 1 to 6, 9, to 12, 15 to 20, 23 to 28, and 31 to 34 have superior panel intensities compared with a conventional PDP, the panel intensity of which is about 400 cd/m$^2$.

The observation of the bubble sizes, and the results of the withstand voltage test of the dielectric glass layers and the acceleration life test of the PDPs show that the PDPs corresponding to the test samples Nos. 1 to 6, 9 to 12, 15 to 20, 23 to 28, and 31 to 34 including the dielectric glass layers that have been formed using the glass materials in which the average particle diameter of the glass powder is 0.1 to 1.5 μm and the maximum particle diameter is equal to or smaller than three times the average particle diameter are superior in the voltage endurance and the surface smoothness (refer to the surface roughness data in the far-right column on Tables 7 to 11, the surface roughness means the center line average roughness) compared with the PDPs corresponding to the test samples 7, 8, 13, 14, 21, 22, 20, 30, 35, and 36 including the dielectric glass layers that have been formed using the glass materials in which the average particle diameter of the glass powder is equal to or larger than 1.5 μm or the glass materials in which the average particle diameter of the glass powder is equal to or smaller than 1.5 μm and the maximum particle diameter is more than three times the average particle diameter.

As a result, coating of the Ag electrodes by the dielectric glass layer that has been formed using a glass powder in which the average particle diameter of the glass powder is 0.1 to 1.5 μm and the maximum particle diameter is smaller than three times the average particle diameter may improve the voltage endurance even when the thickness of the dielectric glass layer is set to be smaller than 20 μm, i.e., even when the dielectric glass layer is thinner than a conventional one so that an improved intensity is obtained.

Note that the dielectric glass layers formed using the glass powder the average particle diameter of which is set to be equal to or larger than 3 μm for the PDPs corresponding to the test samples Nos. 7, 13, 21, 29, and 35, and the dielectric glass layers formed using the glass powder the average particle diameter of which is set to be 1.5 μm and the maximum particle diameter is set to be larger than three times the average particle diameter for the PDPs corresponding to the test samples Nos 8, 14, 22, 30, and 36 are easy to have electrical breakdown even though these dielectric glass layers are thicker than those in the PDPs corresponding to the test samples Nos. 1 to 6, 9 to 12, 15 to 20, 23 to 28, and 31 to 34.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

TABLE 1 conditions of dielectric glass layer on front panel

| test sample No. | composition of glass layer on discharge electrodes: PbO | $B_2O_3$ | $SiO_2$ | CaO | $Al_2O_3$ | glass powder: average particle diameter (μm) | glass powder: maximum particle diameter (μ) | glass softening point | glass paste: glass powder component (wt %) | glass paste: component of binder including solvent (wt %) | firing temper-ture(° C.) | layer thickness (μm) | surface rough-ness (μm) |
|---|---|---|---|---|---|---|---|---|---|---|---|---|---|
| 1 | 50 | 25 | 15 | 10 | 0 | 0.1 | 0.3 | 560 | 55 | 45 | 580 | 10 | ±0.1 |
| 2 | 65 | 10 | 22 | 1 | 2 | 0.5 | 1.5 | 550 | 65 | 35 | 560 | 15 | ±0.5 |
| 3 | 45 | 30 | 20 | 5 | 0 | 0.8 | 2.4 | 570 | 70 | 30 | 590 | 13 | ±0.9 |
| 4 | 55 | 10 | 30 | 5 | 0 | 1.0 | 3.0 | 575 | 70 | 30 | 590 | 14 | ±1.0 |
| 5 | 62 | 20 | 10 | 5 | 3 | 1.5 | 4.5 | 550 | 70 | 30 | 560 | 14 | ±1.5 |
| 6 | 59 | 10 | 25 | 5 | 1 | 0.7 | 2.0 | 555 | 65 | 35 | 570 | 15 | ±0.7 |
| 7* | " | " | " | " | " | 3.0 | 6.0 | " | " | " | " | " | ±3.0 |
| 8* | " | " | " | " | " | 1.5 | 6.0 | " | " | " | " | " | ±2.5 |

*test samples Nos. 7, 8 are comparative examples

TABLE 2 conditions of dielectric glass layer on front panel(continued)

| test sample No. | composition of glass layer on discharge electrodes: PbO | $B_2O_3$ | $SiO_2$ | CaO | $Al_2O_3$ | glass powder: average particle diameter (μm) | glass powder: maximum particle diameter (μ) | glass softening point | glass paste: glass powder component (wt %) | glass paste: component of binder including solvent (wt %) | firing temper-ture (° C.) | layer thickness (μm) | surface rough-ness (μm) |
|---|---|---|---|---|---|---|---|---|---|---|---|---|---|
| 9 | 35 | 25 | 25 | 10 | 5 | 0.1 | 0.3 | 580 | 55 | 45 | 590 | 14 | ±0.1 |
| 10 | 45 | 30 | 15 | 7 | 3 | 0.5 | 1.5 | 550 | 60 | 40 | 575 | " | ±0.5 |
| 11 | 37 | 28 | 20 | 5 | 10 | 1.5 | 4.5 | 570 | " | " | " | " | ±1.0 |
| 12 | 35 | 30 | 17 | 10 | 8 | 0.8 | 2.4 | 575 | " | " | " | " | ±0.7 |
| 13* | " | " | " | " | " | 3.0 | 9.0 | " | " | " | " | 15 | ±3.0 |
| 14* | " | " | " | " | " | 1.5 | 6.0 | " | " | " | " | " | ±2.0 |

*test samples Nos. 13, 14 are comparative examples

TABLE 3 conditions of dielectric glass layer on back panel

| test sample No. | composition of glass layer on discharge electrodes: PbO | $B_2O_3$ | $SiO_2$ | CaO | glass powder: average particle diameter (μm) | glass powder: maximum particle diameter (μm) | $TiO_2$ filler: particle diameter (μm) | $TiO_2$ filler: glass/ $TiO_2$ (wt %) | binder component: resin | binder component: solvent | binder component: resin/ solvent (wt %) | glass paste: glass or filler (wt %) | glass paste: binder (wt %) | firing tempera-ture (° C.) | surface rough-ness (μm) |
|---|---|---|---|---|---|---|---|---|---|---|---|---|---|---|---|
| 1 | 70 | 10 | 20 | 0 | 0.1 | 0.3 | 0.1 | 100/20 | A | B | 2/98 | 65 | 35 | 550 | 13 |
| 2 | 65 | 20 | 10 | 5 | 0.5 | 1.5 | 0.2 | 100/30 | " | " | " | " | " | " | " |
| 3 | 60 | 15 | 15 | 10 | 0.5 | 1.5 | 0.2 | " | " | " | " | " | " | 560 | " |
| 4 | 68 | 20 | 10 | 2 | 1.0 | 3.0 | 0.3 | " | " | " | " | " | " | 570 | " |
| 5 | 65 | 20 | 10 | 5 | 1.5 | 4.5 | 0.5 | " | " | " | " | " | " | 590 | " |
| 6 | " | " | " | " | 1.0 | 3.0 | 0.2 | " | " | " | " | " | " | 560 | " |
| 7* | " | " | " | " | 3.0 | 9.0 | " | " | " | " | " | " | " | " | 15 |
| 8* | " | " | " | " | 1.5 | 6.0 | " | " | " | " | " | " | " | " | 15 |

*test samples Nos. 7, 8 are comparative examples
A: ethyl cellulose
B: terpineol

TABLE 4

| test sample No. | composition of glass layer on discharge electrodes: PbO | $B_2O_3$ | $SiO_2$ | CaO | glass powder: average particle diameter (μm) | glass powder: maximum particle diameter (μm) | $TiO_2$ filler: particle diameter (μm) | $TiO_2$ filler: glass/$TiO_2$ (wt %) | binder component: resin | binder component: solvent | binder component: resin/solvent (wt %) | glass paste: glass or filler (wt %) | glass paste: binder (wt %) | firing temperature (° C.) | surface roughness (μm) |
|---|---|---|---|---|---|---|---|---|---|---|---|---|---|---|---|
| 9 | 70 | 10 | 20 | 0 | 0.1 | 0.3 | 0.1 | 100/20 | A | B | 2/98 | 65 | 35 | 550 | 13 |
| 10 | 65 | 20 | 10 | 5 | 0.5 | 1.5 | 0.2 | 100/30 | " | " | " | " | " | " | |
| 11 | " | 20 | 10 | 5 | 1.5 | 4.5 | 0.2 | " | " | " | " | " | " | " | |
| 12 | " | " | " | " | 0.8 | 2.1 | 0.3 | " | " | " | " | " | " | " | " |
| 13* | " | " | " | " | 3.0 | 9.0 | " | " | " | " | " | " | " | " | 15 |
| 14* | " | " | " | " | 1.5 | 6.0 | " | " | " | " | " | " | " | " | " |

Table 4 title: conditions of dielectric glass layer on back panel(continued)

*test samples Nos. 7, 8 are comparative examples
A: ethyl cellulose
B: terpineol

TABLE 5 characteristics of PDP panel

| test sample No. | size of bubble in dielectric glass layer (μm): on discharge electrodes | size of bubble in dielectric glass layer (μm): on address electrodes | dielectric glass layer dielectric strength (DC, KV): on discharge electrodes | dielectric glass layer dielectric strength (DC, KV): on address electrodes | dielectric glass layer transmittance (%) | voltage endurance defect after aging (per 20) | panel intensity (cd/$m^2$) |
|---|---|---|---|---|---|---|---|
| 1 | none | none | 3.0 | 2.9 | 95 | 0 | 560 |
| 2 | none | none | 3.5 | 3.0 | 95 | 0 | 555 |
| 3 | 0.1 | 0.1 | 2.9 | 2.7 | 94 | 0 | 548 |
| 4 | 0.1 | 0.1 | 2.9 | 2.7 | 94 | 0 | 543 |
| 5 | 0.2 | 0.2 | 2.8 | 2.5 | 93 | 0 | 541 |
| 6 | 0.1 | 0.1 | 3.0 | 2.8 | 94 | 0 | 553 |
| 7* | 3.0 | 3.1 | 1.5 | 1.0 | 83 | 4 | 520 |
| 8* | 3.5 | 3.8 | 1.0 | 0.8 | 84 | 5 | 518 |

*test samples Nos. 7, 8 are comparative examples

TABLE 6 characteristics of PDP panel(continued)

| test sample No. | size of bubble in dielectric glass layer (μm): on discharge electrodes | size of bubble in dielectric glass layer (μm): on address electrodes | dielectric glass layer dielectric strength (DC, KV): on discharge electrodes | dielectric glass layer dielectric strength (DC, KV): on address electrodes | dielectric glass layer transmittance (%) | voltage endurance defect after aging (per 20) | panel intensity (cd/$m^2$) |
|---|---|---|---|---|---|---|---|
| 9 | none | none | 3.2 | 3.0 | 95 | 0 | 539 |
| 10 | none | none | 3.2 | 3.1 | 94 | 0 | 564 |
| 11 | 0.2 | 0.2 | 2.9 | 2.7 | 93 | 0 | 558 |
| 12 | 0.1 | 0.1 | 3.0 | 2.8 | 92 | 0 | 557 |
| 13* | 3.5 | 4.0 | 1.0 | 0.8 | 81 | 9 | 518 |
| 14* | 3.0 | 3.0 | 1.1 | 0.9 | 82 | 10 | 515 |

*test samples Nos. 13, 14 are comparative examples

TABLE 7

| conditions of dielectric glass layer on front panel | | | | | | | | | |
|---|---|---|---|---|---|---|---|---|---|
| test sample No. | composition of glass layer on discharge electrodes (wt %) PbO | $B_2O_3$ | $SiO_2$ | CaO | $Al_2O_3$ | average particle diameter of gladd powder (μm) maximum particle diameter (μm) | glass softening point(° C.) | component of glass powder in glass paste (wt %) | component of binder including solvent (wt %) |
| 1 | 50 | 25 | 15 | 10 | 0 | 0.1 maximum 0.30 | 560 | 55 | ethyl cellulose 45 |
| 2 | 65 | 10 | 22 | 1 | 2 | 0.5 maximum 1.4 | 550 | 65 | acrylyl 35 |
| 3 | 45 | 30 | 20 | 5 | 0 | 0.8 maximum 2.3 | 570 | 70 | ethyl cellulose 30 |
| 4 | 55 | 10 | 30 | 5 | 0 | 1.0 maximum 3.0 | 575 | 35 | ethyl cellulose 65 |
| 5 | 62 | 20 | 10 | 5 | 3 | 1.5 maximum 4.0 | 550 | 35 | ethyl cellulose 65 |
| 6 | 59 | 10 | 25 | 5 | 1 | 0.7 maximum 2.0 | 555 | 50 | ethyl cellulose 50 |
| 7* | 59 | 10 | 25 | 5 | 1 | 3.0 maximum 6.0 | 555 | 55 | ethyl cellulose 45 |
| 8* | 59 | 10 | 25 | 5 | 1 | 1.5 maximum 6.00 | 555 | 55 | ethyl cellulose 45 |

| test sample No. | separator in binder (wt %) | plasticizer in binder (wt %) | paste viscosity (cp) | coating method | dielectric glass firing temperature (° C.) | dielectric glass layer thickness (μm) | dielectric glass layer surface roughness (μm) |
|---|---|---|---|---|---|---|---|
| 1 | sorbitan sesquioleate 0.2 | dioctyl phthalate 2.0 | 3.075 | die coating method | 580 | 10 | ±0.00 |
| 2 | glycerol monooleate 0.2 | dibutyl phthalate 1.0 | 4.075 | die coating method | 560 | 15 | ±0.0 |
| 3 | glycerol monooleate 0.2 | dibutyl phthalate 1.0 | 5.075 | die coating method | 590 | 13 | ±0.7 |
| 4 | glycerol monooleate 0.2 | dibutyl phthalate 2.0 | 500 | spray coating method | 590 | 14 | ±0.8 |
| 5 | glycerol monooleate 0.2 | dibutyl phthalate 2.0 | 100 | spin coating method | 560 | 14 | ±1.0 |
| 6 | glycerol monooleate 0.2 | dibutyl phthalate 2.0 | 175 | blade coating method | 570 | 15 | ±0.5 |
| 7* | glycerol monooleate 0.2 | dibutyl phthalate 2.0 | 3.075 | screen printing method | 570 | 15 | ±5.0 |
| 8* | glycerol monooleate 0.2 | dibutyl phthalate 2.0 | 3.075 | screen printing method | 570 | 15 | ±5.0 |

*test samples Nos. 7, 8 are comparative examples

TABLE 8

| conditions of dielectric glass layer on front panel | | | | | | | | | |
|---|---|---|---|---|---|---|---|---|---|
| test sample No. | composition of glass layer on discharge electrodes (wt %) $B_2O_3$ | ZnO | $BrO_2$ | $SiO_2$ | CaO | average particle diameter of gladd powder (μm) maximum particle diameter (μm) | glass softening point(° C.) | component of glass powder in glass paste (wt %) | component of binder including solvent (wt %) |
| 9 | 35 | 25 | 15 | 10 | 5 | 0.1 maximum 0.30 | 580 | 55 | acrylyl 45 |

TABLE 8-continued conditions of dielectric glass layer on front panel

| | | | | | | | | | |
|---|---|---|---|---|---|---|---|---|---|
| 10 | 45 | 30 | 15 | 7 | 3 | 0.5<br>maximum 0.6 | 550 | 60 | ethyl<br>cellulose 40 |
| 11 | 37 | 28 | 20 | 5 | 10 | 1.5<br>maximum 4.0 | 570 | 35 | ethyl<br>cellulose 65 |
| 12 | 35 | 30 | 17 | 10 | 8 | 0.8<br>maximum 2.4 | 575 | 40 | ethyl<br>cellulose 60 |
| 13* | 35 | 30 | 17 | 10 | 8 | 3.0<br>maximum 9.0 | 575 | 60 | ethyl<br>cellulose 40 |
| 14* | 35 | 30 | 17 | 10 | 8 | 1.5<br>maximum 6.0 | 575 | 60 | ethyl<br>cellulose 40 |

| test sample No. | separator in binder (wt %) | plasticizer in binder (wt %) | paste viscosity (cp) | coating method | dielectric glass firing temperature (° C.) | dielectric glass layer thickness ($\mu$m) | dielectric glass layer surface roughness ($\mu$m) |
|---|---|---|---|---|---|---|---|
| 9 | homogenol 0.2 | dibutyl phthalate 2.0 | 2.575 | die coating method | 580 | 14 | ±0.07 |
| 10 | homogenol 0.4 | dibutyl phthalate 2.0 | 3.575 | die coating method | 575 | 14 | ±0.3 |
| 11 | sorbitan sesquioleate 0.2 | dibutyl phthalate 2.0 | 300 | spin coating method | 575 | 14 | ±0.7 |
| 12 | sorbitan sesquioleate 0.2 | dibutyl phthalate 2.0 | 1000 | spray coating method | 575 | 14 | ±0.5 |
| 13* | sorbitan sesquioleate 0.2 | dibutyl phthalate 2.0 | 3.575 | screen printing method | 575 | 15 | ±6.0 |
| 14* | sorbitan sesquioleate 0.2 | dibutyl phthalate 2.0 | 3.575 | screen printing method | 575 | 15 | ±5.5 |

*test samples Nos. 13, 14 are comparative examples

TABLE 9 conditions of dielectric glass layer on front panel

| test sample | composition of glass layer on discharge electrodes (wt %) | | | | | average particle diameter of gladd powder ($\mu$m) maximum particle | glass softening | component of glass powder in glass | component of binder including solvent |
|---|---|---|---|---|---|---|---|---|---|
| No. | ZnO | $B_2O_3$ | $SiO_2$ | $Al_2O_3$ | CaO | diameter ($\mu$m) | point(° C.) | paste (wt %) | (wt %) |
| 15 | 44 | 30 | 10.5 | 5.5 | 10 | 0.1<br>maximum 0.30 | 552 | 55 | acrylyl<br>45 |
| 16 | 60 | 19 | 10 | 1 | 10 | 0.5<br>maximum 1.5 | 559 | 65 | acrylyl<br>35 |
| 17 | 60 | 30 | 1 | 5 | 4 | 0.8<br>maximum 2.0 | 553 | 70 | ethyl<br>cellulose 30 |
| 18 | 50 | 30 | 5 | 1 | 4 | 1.0<br>maximum 2.0 | 550 | 35 | ethyl<br>cellulose 65 |
| 19 | 50 | 25 | 10 | 10 | 5 | 1.5<br>maximum 4.0 | 558 | 45 | ethyl<br>cellulose 56 |
| 20 | 50 | 25 | 10 | 10 | 5 | 0.7<br>maximum 2.0 | 558 | 45 | ethyl<br>cellulose 55 |
| 21* | 50 | 25 | 10 | 10 | 5 | 3.0<br>maximum 6.00 | 558 | 45 | ethyl<br>cellulose 55 |
| 22* | 50 | 25 | 10 | 10 | 5 | 1.5<br>maximum 6.00 | 558 | 45 | ethyl<br>cellulose 55 |

TABLE 9-continued

| conditions of dielectric glass layer on front panel | | | | | | | |
|---|---|---|---|---|---|---|---|
| test sample No. | separator in binder (wt %) | plasticizer in binder (wt %) | paste viscosity (cp) | coating method | dielectric glass firing temperature (° C.) | dielectric glass layer thickness (μm) | dielectric glass layer surface roughness (μm) |
| 15 | homogenol 0.2 | dioctyl phthalate 2.0 | 3.075 | die coating method | 570 | 10 | ±0.06 |
| 16 | glycerol monooleate 2.0 | dibutyl phthalate 3.0 | 4.075 | die coating method | 560 | 15 | ±0.3 |
| 17 | sorbitan sesquioleate 0.2 | dibutyl phthalate 4.0 | 4.875 | die coating method | 580 | 13 | ±0.7 |
| 18 | homogenol 0.2 | dibutyl phthalate 4.0 | 500 | spin coating method | 580 | 14 | ±0.8 |
| 19 | homogenol 0.2 | dibutyl phthalate 4.0 | 1000 | spray coating method | 560 | 14 | ±0.8 |
| 20 | homogenol 0.2 | dibutyl phthalate 4.0 | 2000 | blade coating method | 560 | 15 | ±1.2 |
| 21* | homogenol 0.2 | dibutyl phthalate 4.0 | 4.175 | screen printing method | 560 | 15 | ±5.0 |
| 22* | homogenol 0.2 | dibutyl phthalate 4.0 | 4.175 | screen printing method | 560 | 15 | ±5.0 |

*test samples Nos. 21, 22 are comparative examples

TABLE 10

| conditions of dielectric glass layer on front panel | | | | | | | | |
|---|---|---|---|---|---|---|---|---|
| test sample | composition of glass layer on discharge electrodes (wt %) | | | | average particle diameter of gladd powder (μm) maximum particle | glass softening | component of glass powder in glass | component of binder including solvent |
| No. | $BrO_2$ | $B_2O_3$ | $Al_2O_3$ | CaO | diameter (μm) | point(° C.) | paste (wt %) | (wt %) |
| 23 | 42 | 43 | 13 | 13 | 0.1 maximum 0.30 | 525 | 55 | acrylyl 45 |
| 24 | 63 | 19 | 9 | 9 | 0.5 maximum 1.5 | 505 | 65 | acrylyl 35 |
| 25 | 45 | 50 | 5 | 0 | 0.8 maximum 2.4 | 556 | 70 | ethylene oxide 30 |
| 26 | 50 | 35 | 7 | 8 | 1.0 maximum 3.0 | 508 | 35 | ethyl cellulose 65 |
| 27 | 50 | 35 | 14 | 1 | 1.5 maximum 4.5 | 502 | 40 | ethyl cellulose 60 |
| 28 | 50 | 35 | 14 | 1 | 0.7 maximum 2.0 | 502 | 50 | acrylyl 50 |
| 29* | 50 | 35 | 14 | 1 | 3.0 maximum 6.00 | 502 | 65 | acrylyl 35 |
| 30* | 50 | 35 | 14 | 1 | 1.5 maximum 6.00 | 502 | 65 | acrylyl 35 |

| test sample No. | separator in binder (wt %) | plasticizer in binder (wt %) | paste viscosity (cp) | coating method | dielectric glass firing temperature (° C.) | dielectric glass layer thickness (μm) | dielectric glass layer surface roughness (μm) |
|---|---|---|---|---|---|---|---|
| 23 | homogenol 0.2 | dibutyl phthalate 2.5 | 2.575 | die coating method | 580 | 10 | ±0.07 |

TABLE 10-continued

| conditions of dielectric glass layer on front panel | | | | | | | |
|---|---|---|---|---|---|---|---|
| 24 | glycerol monooleate 0.2 | dibutyl phthalate 2.5 | 3.075 | die coating method | 510 | 15 | ±0.3 |
| 25 | sorbitan sesquioleate 0.1 | dioctyl phthalate 3.0 | 4.075 4.075 | die coating method | 570 | 13 | ±0.5 |
| 26 | homogenol 0.2 | dibutyl phthalate 3.0 | 1500 | spin coating method | 515 | 14 | ±0.7 |
| 27 | homogenol 0.2 | glycerol 2.0 | 15000 | spray coating method | 510 | 14 | ±1.0 |
| 28 | glycerol monooleate 0.2 | dioctyl phthalate 1.5 | 275 | spray coating method | 510 | 15 | ±0.5 |
| 29* | homogenol 0.1 | none | 3.875 | screen printing method | 510 | 15 | ±4.0 |
| 30* | homogenol 0.1 | none | 4.075 | screen printing method | 510 | 15 | ±3.5 |

*test samples Nos. 29, 30 are comparative examples

TABLE 11 conditions of dielectric glass layer on front panel

| test sample No. | composition of glass layer on discharge electrodes (wt %) $Nb_2O_5$ | ZnO | $B_2O_3$ | $SiO_2$ | CaO | average particle diameter of gladd powder (μm) maximum particle diameter (μm) | glass softening point(° C.) | component of glass powder in glass paste (wt %) | component of binder including solvent (wt %) |
|---|---|---|---|---|---|---|---|---|---|
| 31 | 19 | 44 | 30 | 7 | 0 | 0.1 maximum 0.30 | 550 | 55 | acrylyl 45 |
| 32 | 9 | 60 | 25 | 1 | 5 | 0.5 maximum 1.5 | 556 | 60 | ethyl cellulose 40 |
| 33 | 14.5 | 54 | 19 | 10.5 | 2 | 1.5 maximum 4.5 | 560 | 40 | ethyl cellulose 60 |
| 34 | 15 | 50 | 20 | 10 | 5 | 0.8 maximum 2.4 | 566 | 40 | ethyl cellulose 60 |
| 35* | 15 | 50 | 20 | 10 | 5 | 3.0 maximum 9.0 | 566 | 70 | ethyl cellulose 30 |
| 36* | 15 | 50 | 20 | 10 | 5 | 1.5 maximum 6.0 | 566 | 70 | ethyl cellulose 30 |

| test sample No. | separator in binder (wt %) | plasticizer in binder (wt %) | paste viscosity (cp) | coating method | dielectric glass firing temperature (° C.) | dielectric glass layer thickness (μm) | dielectric glass layer surface roughness (μm) |
|---|---|---|---|---|---|---|---|
| 31 | homogenol 0.3 | dibutyl phthalate 2.0 | 3.175 | die coating method | 570 | 14 | ±0.05 |
| 32 | glycerol monooleate 0.2 | dioctyl phthalate 2.0 | 3.375 | die coating method | 575 | 14 | ±0.3 |
| 33 | glycerol sesquioleate 0.2 | dioctyl phthalate 2.0 | 3000 | spin coating method | 575 | 14 | ±0.6 |
| 34 | homogenol 0.2 | dioctyl phthalate 2.0 | 5000 | spray coating method | 575 | 14 | ±0.4 |

TABLE 11-continued

| conditions of dielectric glass layer on front panel | | | | | | | |
|---|---|---|---|---|---|---|---|
| 35* | homogenol 0.2 | dioctyl phthalate 2.0 | 4.075 | screen printing method | 575 | 15 | ±5.6 |
| 36* | homogenol 0.2 | dioctyl phthalate 2.0 | 2.075 | screen printing method | 575 | 15 | ±4.5 |

*test samples Nos. 35, 36 are comparative examples

TABLE 12

| test sample No. | composition of glass layer on second electrodes (wt %) PbO | $B_2O_3$ | $SiO_2$ | CaO | average particle diameter of gladd powder (μm) maximum particle diameter (μm) | filler: particle diameter titanium oxide (μm) | filler: glass/$TiO_2$ (wt %) | glass paste: proportion of binder: resin and solvent (binder component) resin/solvent | (wt %) | glass paste: glass or filler (wt %) | glass paste: binder (wt %) | separator in binder (wt %) | plasticizer in binder (wt %) | coating method | firing temperature (° C.) | surface roughness (μm) |
|---|---|---|---|---|---|---|---|---|---|---|---|---|---|---|---|---|
| 1 | 70 | 10 | 20 | 0 | 0.1 maximum 0.30 | 0.1 | 100/20 | ethyl cellulose terpineol | (2/98) | 65 | 35 | glycerol monooleate 0.2 | dibutyl phthalate 2.0 | die coating method | 550 | 13 |
| 2 | 65 | 20 | 10 | 5 | 0.5 maximum 1.4 | 0.2 | 100/30 | ethyl cellulose terpineol | (2/98) | 65 | 35 | glycerol monooleate 0.2 | dibutyl phthalate 2.0 | die coating method | 550 | 13 |
| 3 | 60 | 15 | 15 | 10 | 0.5 maximum 1.4 | 0.2 | 100/30 | ethyl cellulose terpineol | (2/98) | 65 | 35 | glycerol monooleate 0.2 | dibutyl phthalate 2.0 | die coating method | 560 | 13 |
| 4 | 68 | 20 | 10 | 2 | 0.1 maximum 3.0 | 0.3 | 100/30 | ethyl cellulose terpineol | (2/98) | 65 | 35 | glycerol monooleate 0.2 | dibutyl phthalate 2.0 | die coating method | 570 | 13 |
| 5 | 65 | 20 | 10 | 5 | 1.5 maximum 4.0 | 0.5 | 100/30 | ethyl cellulose terpineol | (2/98) | 65 | 35 | glycerol monooleate 0.2 | dibutyl phthalate 2.0 | die coating method | 590 | 13 |
| 6 | 65 | 20 | 10 | 5 | 1.0 maximum 2.5 | 0.2 | 100/30 | ethyl cellulose terpineol | (2/98) | 65 | 35 | glycerol monooleate 0.2 | dibutyl phthalate 2.0 | die coating method | 560 | 13 |
| 7* | 65 | 20 | 10 | 5 | 3.0 maximum 6.00 | 0.2 | 100/30 | ethyl cellulose terpineol | (2/98) | 65 | 35 | glycerol monooleate 0.2 | dibutyl phthalate 2.0 | die coating method | 560 | 15 |
| 8* | 65 | 20 | 10 | 5 | 0.5 maximum 6.00 | 0.2 | 100/30 | ethyl cellulose terpineol | (2/98) | 65 | 35 | glycerol monooleate 0.2 | dibutyl phthalate 2.0 | die coating method | 560 | 15 |

*test samples Nos. 7, 8 are comparative examples

TABLE 13

| test sample No. | composition of glass layer on second electrodes (wt %) PbO | $B_2O_3$ | $SiO_2$ | CaO | average particle diameter of gladd powder (μm) maximum particle diameter (μm) | filler: diameter particle titanium oxide (μm) | filler: glass/ $TiO_2$ (wt %) | proportion of binder resin and solvent binder component): resin/ solvent | (wt %) | glass paste: glass or filler (wt %) | glass paste: binder (wt %) | separator in binder (wt %) | plasticizer in binder (wt %) | coating method | firing temperature (° C.) | surface roughness (μm) |
|---|---|---|---|---|---|---|---|---|---|---|---|---|---|---|---|---|
| | | | | | conditions of dielectric glass layer on back panel | | | | | | | | | | | |
| 9 | 70 | 10 | 20 | 0 | 0.1 maximum 0.30 | 0.1 | 100/ 20 | ethyl cellulose terpineol | (2/ 98) | 65 | 35 | glycerol mono- oleate 0.2 | dibutyl phthalate 2.0 | die coating method | 550 | 13 |
| 10 | 65 | 20 | 10 | 5 | 0.5 maximum 0.6 | 0.2 | 100/ 30 | ethyl cellulose terpineol | (2/ 98) | 65 | 35 | glycerol mono- oleate 0.2 | dibutyl phthalate 2.0 | die coating method | 550 | 13 |
| 11 | 65 | 20 | 10 | 5 | 1.5 maximum 4.0 | 0.2 | 100/ 30 | ethyl cellulose terpineol | (2/ 98) | 65 | 35 | glycerol mono- oleate 0.2 | dibutyl phthalate 2.0 | die coating method | 560 | 13 |
| 12 | 65 | 20 | 10 | 5 | 0.8 maximum 2.4 | 0.3 | 100/ 30 | ethyl cellulose terpineol | (2/ 98) | 65 | 35 | glycerol mono- oleate 0.2 | dibutyl phthalate 2.0 | die coating method | 560 | 13 |
| 13* | 65 | 20 | 10 | 5 | 3.0 maximum 9.0 | 0.3 | 100/ 30 | ethyl cellulose terpineol | (2/ 98) | 65 | 35 | glycerol mono- oleate 0.2 | dibutyl phthalate 2.0 | die coating method | 560 | 15 |
| 14* | 65 | 20 | 10 | 5 | 1.5 maximum 6.0 | 0.3 | 100/ 30 | ethyl cellulose terpineol | (2/ 98) | 65 | 35 | glycerol mono- oleate 0.2 | dibutyl phthalate 2.0 | die coating method | 560 | 15 |

*test samples Nos. 13, 14 are comparative examples

TABLE 14

| test sample No. | composition of glass layer on second electrodes (wt %) ZnO | $B_2O_3$ | $SiO_2$ | $Al_2O_3$ | CaO | average particle diameter of gladd powder (μm) maximum particle diameter (μm) | filler: particle diameter titanium oxide (μm) | filler: glass/ $TiO_2$ (wt %) | proportion of binder resin and solvent (binder component): resin/ solvent | (wt %) | glass paste: glass or filler (wt %) | glass paste: binder (wt %) | separator in binder (wt %) | plasticizer in binder (wt %) | coating method | firing temperature (° C.) | surface roughness (μm) |
|---|---|---|---|---|---|---|---|---|---|---|---|---|---|---|---|---|---|
| | | | | | | conditions of dielectric glass layer on back panel | | | | | | | | | | | |
| 15 | 60 | 30 | 5 | 1 | 4 | 0.1 maximum 0.30 | 0.1 | 100/ 20 | ethyl cellu- lose ter- pineol | (2/ 98) | 65 | 35 | sorbitan sesqui- oleare 0.2 | dioctyl phtha- late 2.0 | die coat- ing meth- od | 580 | 13 |
| 16 | 60 | 30 | 5 | 1 | 4 | 0.5 maximum 1.5 | 0.2 | 100/ 30 | ethyl cellu- lose ter- pineol | (2/ 98) | 65 | 35 | glycerol mono- oleate 0.2 | dioctyl phtha- late 2.0 | die coat- ing meth- od | " | 13 |
| 17 | 50 | 25 | 5 | 10 | 10 | 0.5 maximum 1.5 | 0.2 | 100/ 30 | ethyl cellu- lose ter- pineol | (2/ 98) | 65 | 35 | glycerol mono- oleate 0.2 | dioctyl phtha- late 2.0 | die coat- ing meth- od | 565 | " |
| 18 | 50 | 25 | 5 | 10 | 10 | 1.0 maximum 2.0 | 0.3 | 100/ 30 | ethyl cellu- lose | (2/ 98) | 65 | 35 | glycerol mono- oleate | dioctyl phtha- late 2.0 | spray coat- ing | 565 | " |

TABLE 14-continued

| test sample No. | composition of glass layer on second electrodes (wt %): ZnO | $B_2O_3$ | $SiO_2$ | $Al_2O_3$ | CaO | average particle diameter of gladd powder (μm) maximum particle diameter (μm) | filler: particle diameter titanium oxide (μm) | filler: glass/$TiO_2$ (wt %) | glass paste: proportion of binder resin and solvent (binder component): resin/solvent | (wt %) | glass paste: glass or filler (wt %) | binder (wt %) | separator in binder (wt %) | plasticizer in binder (wt %) | coating method | firing temperature (° C.) | surface roughness (μm) |
|---|---|---|---|---|---|---|---|---|---|---|---|---|---|---|---|---|---|
| | | | | | | | | | terpineol | | | | 0.2 | | method | | |
| 19 | 50 | 25 | 5 | 10 | 10 | 1.5 maximum 4.0 | 0.5 | 100/30 | ethyl cellulose terpineol | (2/98) | 65 | 35 | glycerol monooleate 0.2 | dioctyl phthalate 2.0 | screen printing method | 585 | " |
| 20 | 50 | 25 | 10 | 10 | 5 | 1.0 maximum 2.0 | 0.2 | 100/30 | ethyl cellulose terpineol | (2/98) | 65 | 35 | glycerol monooleate 0.2 | dioctyl phthalate 2.0 | screen printing method | 585 | " |
| 21* | 50 | 25 | 10 | 10 | 5 | 3.0 maximum 6.0 | 0.2 | 100/30 | ethyl cellulose terpineol | (2/98) | 65 | 35 | glycerol monooleate 0.2 | dioctyl phthalate 2.0 | screen printing method | 585 | 15 |
| 22* | 50 | 25 | 10 | 10 | 5 | 1.5 maximum 6.0 | 0.2 | 100/30 | ethyl cellulose terpineol | (2/98) | 65 | 35 | glycerol monooleate 0.2 | dioctyl phthalate 2.0 | screen printing method | 585 | 15 |

*test samples Nos. 21, 22 are comparative examples

TABLE 15

| test sample No. | composition of glass layer on second electrodes (wt %): $P_2O_5$ | $B_2O_3$ | $SiO_2$ | CaO | average particle diameter of gladd powder (μm) maximum particle diameter (μm) | filler: diameter particle titanium oxide (μm) | filler: glass/$TiO_2$ (wt %) | glass paste: proportion of binder resin and solvent binder component): resin/solvent | (wt %) | glass paste: glass or filler (wt %) | binder (wt %) | separator in binder (wt %) | plasticizer in binder (wt %) | coating method | firing temperature (° C.) | surface roughness (μm) |
|---|---|---|---|---|---|---|---|---|---|---|---|---|---|---|---|---|
| 23 | 63 | 19 | 9 | 9 | 0.1 maximum 0.3 | 0.1 | 100/20 | ethyl cellulose terpineol | (2/98) | 65 | 35 | glycerol monooleate 0.2 | dibutyl phthalate 2.0 | die coating method | 540 | 13 |
| 24 | 63 | 19 | 9 | 9 | 0.5 maximum 1.5 | 0.2 | 100/30 | ethyl cellulose terpineol | (2/98) | 65 | 35 | glycerol monooleate 0.2 | dibutyl phthalate 2.0 | die coating method | 540 | 13 |
| 25 | 50 | 35 | 7 | 8 | 0.5 maximum 1.5 | 0.2 | 100/30 | ethyl cellulose terpineol | (2/98) | 65 | 35 | glycerol monooleate 0.2 | dibutyl phthalate 2.0 | die coating method | 545 | 13 |
| 26 | 50 | 35 | 7 | 8 | 1.0 maximum 0.3 | 0.3 | 100/30 | ethyl cellulose terpineol | (2/98) | 65 | 35 | glycerol monooleate 0.2 | dibutyl phthalate 2.0 | die coating method | 545 | 13 |

TABLE 15-continued

| test sample No. | composition of glass layer on second electrodes (wt %): $P_2O_5$ | $B_2O_3$ | $SiO_2$ | CaO | average particle diameter of gladd powder (μm) maximum particle diameter (μm) | filler: diameter particle titanium oxide (μm) | filler: glass/$TiO_2$ (wt %) | proportion of binder resin and solvent binder component): resin/solvent | (wt %) | glass paste: glass or filler (wt %) | glass paste: binder (wt %) | separator in binder (wt %) | plasticizer in binder (wt %) | coating method | firing temperature (° C.) | surface roughness (μm) |
|---|---|---|---|---|---|---|---|---|---|---|---|---|---|---|---|---|
| 27 | 50 | 35 | 7 | 8 | 1.5 maximum 4.5 | 0.5 | 100/30 | ethyl cellulose terpineol | (2/98) | 65 | 35 | glycerol monooleate 0.2 | dibutyl phthalate 2.0 | die coating method | 545 | 13 |
| 28 | 50 | 35 | 7 | 8 | 1.0 maximum 0.3 | 0.2 | 100/30 | ethyl cellulose terpineol | (2/98) | 65 | 35 | glycerol monooleate 0.2 | dibutyl phthalate 2.0 | die coating method | 545 | 13 |
| 29* | 50 | 35 | 7 | 8 | 3.0 maximum 7.0 | 0.2 | 100/30 | ethyl cellulose terpineol | (2/98) | 65 | 35 | glycerol monooleate 0.2 | dibutyl phthalate 2.0 | die coating method | 545 | 15 |
| 30* | 50 | 35 | 7 | 8 | 1.5 maximum 6.5 | 0.2 | 100/30 | ethyl cellulose terpineol | (2/98) | 65 | 35 | glycerol monooleate 0.2 | dibutyl phthalate 2.0 | die coating method | 545 | 15 |

*test samples Nos. 29, 30 are comparative examples

TABLE 16

| test sample No. | composition of glass layer on second electrodes (wt %): $Nb_2O_5$ | ZnO | $B_2O_2$ | $SiO_2$ | CaO | average particle diameter of gladd powder (μm) maximum particle diameter (μm) | filler: particle diameter titanium oxide (μm) | filler: glass/$TiO_2$ (wt %) | proportion of binder resin and solvent (binder component): resin/solvent | (wt %) | glass paste: glass or filler (wt %) | glass paste: binder (wt %) | separator in binder (wt %) | plasticizer in binder (wt %) | coating method | firing temperature (° C.) | surface roughness (μm) |
|---|---|---|---|---|---|---|---|---|---|---|---|---|---|---|---|---|---|
| 31 | 13 | 50 | 24 | 8 | 5 | 0.1 maximum 0.30 | 0.1 | 100/20 | ethyl cellulose terpineol | (2/98) | 65 | 35 | sorbitan sesquioleare 0.2 | dioctyl phthalate 2.0 | die coating method | 570 | 13 |
| 32 | 13 | 50 | 24 | 8 | 5 | 0.5 maximum 1.5 | 0.2 | 100/30 | ethyl cellulose terpineol | (2/98) | 65 | 35 | glycerol monooleate 0.2 | dioctyl phthalate 2.0 | die coating method | 570 | 13 |
| 33 | 13 | 50 | 24 | 8 | 5 | 1.5 maximum 14.0 | 0.2 | 100/30 | ethyl cellulose terpineol | (2/98) | 65 | 35 | glycerol monooleate 0.2 | dioctyl phthalate 2.0 | die coating method | 570 | 13 |
| 34 | 13 | 50 | 24 | 8 | 5 | 0.8 maximum 2.4 | 0.3 | 100/30 | ethyl cellulose terpineol | (2/98) | 65 | 35 | glycerol monooleate 0.2 | dioctyl phthalate 2.0 | die coating method | 570 | 13 |
| 35* | 13 | 50 | 24 | 8 | 5 | 3.0 maximum | 0.3 | 100/30 | ethyl cellu- | (2/98) | 65 | 35 | glycerol mono- | dioctyl phtha- | die coat- | 570 | 15 |

TABLE 16-continued

| test sample No. | composition of glass layer on second electrodes (wt %) Nb$_2$O$_5$ | ZnO | B$_2$O$_2$ | SiO$_2$ | CaO | average particle diameter of gladd powder (µm) maximum particle diameter (µm) | filler: particle diameter titanium oxide (µm) | filler: glass/TiO$_2$ (wt %) | proportion of binder resin and solvent (binder component): resin/solvent | (wt %) | glass paste: glass or filler (wt %) | glass paste: binder (wt %) | separator in binder (wt %) | plasticizer in binder (wt %) | coating method | firing temperature (° C.) | surface roughness (µm) |
|---|---|---|---|---|---|---|---|---|---|---|---|---|---|---|---|---|---|
| | | | | | | 9.0 | | | lose terpineol | | | | oleate 0.2 | late 2.0 | ing method | | |
| 36* | 13 | 50 | 24 | 8 | 5 | 1.5 maximum 6.0 | 0.3 | 100/30 | ethyl cellulose terpineol | (2/98) | 65 | 35 | glycerol monooleate 0.2 | dioctyl phthalate 2.0 | die coating method | 570 | 15 |

*test samples Nos. 35, 36 are comparative examples

TABLE 17

| test sample No. | size of bubble in dielectric glass layer (µm): on discharge electrodes | size of bubble in dielectric glass layer (µm): on address electrodes | dielectric glasslayer voltage endurance (DC, KV): on discharge electrodes | dielectric glasslayer voltage endurance (DC, KV): on address electrodes | dielectric glass layer transmittance (%) | voltage endurance defect after with 200V at 50 kHz (per 20) | panel intensity (cd/m$^2$) |
|---|---|---|---|---|---|---|---|
| 1 | none | none | 3.6 | 3.2 | 97 | 0 | 564 |
| 2 | none | none | 3.8 | 3.3 | 97 | 0 | 560 |
| 3 | none | none | 3.4 | 3.0 | 96 | 0 | 550 |
| 4 | 0.1 | 0.1 | 3.2 | 2.9 | 95 | 0 | 547 |
| 5 | 0.1 | 0.1 | 3.1 | 2.8 | 95 | 0 | 548 |
| 6 | 0.1 | 0.1 | 3.4 | 3.1 | 95 | 0 | 555 |
| 7* | 3.0 | 3.1 | 1.5 | 1.0 | 84 | 4 | 522 |
| 8* | 3.5 | 3.8 | 1.0 | 0.8 | 85 | 5 | 521 |

*test samples Nos. 7, 8 are comparative examples

TABLE 18

| test sample No. | size of bubble in dielectric glass layer (µm): on discharge electrodes | size of bubble in dielectric glass layer (µm): on address electrodes | dielectric glasslayer voltage endurance (DC, KV): on discharge electrodes | dielectric glasslayer voltage endurance (DC, KV): on address electrodes | dielectric glass layer transmittance (%) | voltage endurance defect after with 200V at 50 kHz (per 20) | panel intensity (cd/m$^2$) |
|---|---|---|---|---|---|---|---|
| 9 | none | none | 3.5 | 3.4 | 96 | 0 | 544 |
| 10 | none | none | 3.5 | 3.3 | 96 | 0 | 568 |
| 11 | 0.1 | 0.1 | 3.4 | 3.1 | 94 | 0 | 562 |
| 12 | 0.1 | 0.1 | 3.3 | 3.0 | 94 | 0 | 564 |
| 13* | 3.5 | 4.0 | 1.0 | 0.8 | 82 | 9 | 520 |
| 14* | 3.0 | 3.0 | 1.1 | 0.9 | 83 | 10 | 517 |

*test samples Nos. 13, 14 are comparative examples

TABLE 19

| test sample No. | size of bubble in dielectric glass layer ($\mu$m) on discharge electrodes | size of bubble in dielectric glass layer ($\mu$m) on address electrodes | dielectric glasslayer voltage endurance (DC, KV) on discharge electrodes | dielectric glasslayer voltage endurance (DC, KV) on address electrodes | dielectric glass layer transmittance (%) | voltage endurance defect after with 200V at 50 kHz (per 20) | panel intensity (cd/m$^2$) |
|---|---|---|---|---|---|---|---|
| 15 | none | none | 3.3 | 3.1 | 97 | 0 | 565 |
| 16 | none | none | 3.6 | 3.1 | 97 | 0 | 558 |
| 17 | 0.1 | 0.1 | 3.2 | 2.9 | 95 | 0 | 553 |
| 18 | 0.1 | 0.1 | 3.1 | 2.8 | 95 | 0 | 547 |
| 19 | 0.2 | 0.2 | 3.1 | 2.7 | 94 | 0 | 545 |
| 20 | 0.1 | 0.1 | 3.3 | 2.9 | 95 | 0 | 557 |
| 21* | 4.8 | 4.4 | 1.4 | 0.9 | 81 | 8 | 520 |
| 22* | 4.5 | 4.3 | 0.9 | 0.7 | 83 | 9 | 518 |

*test samples Nos. 21, 22 are comparative examples

TABLE 20

| test sample No. | size of bubble in dielectric glass layer ($\mu$m) on discharge electrodes | size of bubble in dielectric glass layer ($\mu$m) on address electrodes | dielectric glasslayer voltage endurance (DC, KV) on discharge electrodes | dielectric glasslayer voltage endurance (DC, KV) on address electrodes | dielectric glass layer transmittance (%) | voltage endurance defect after with 200V at 50 kHz (per 20) | panel intensity (cd/m$^2$) |
|---|---|---|---|---|---|---|---|
| 23 | none | none | 3.3 | 3.2 | 96 | 0 | 555 |
| 24 | none | none | 3.7 | 3.3 | 96 | 0 | 560 |
| 25 | 0.1 | 0.1 | 3.2 | 3.0 | 95 | 0 | 553 |
| 26 | 0.1 | 0.1 | 3.2 | 3.0 | 95 | 0 | 550 |
| 27 | 0.1 | 0.1 | 3.2 | 2.7 | 94 | 0 | 548 |
| 28 | 0.1 | 0.1 | 3.1 | 3.0 | 95 | 0 | 555 |
| 29* | 3.2 | 3.5 | 1.5 | 1.0 | 83 | 7 | 519 |
| 30* | 4.0 | 3.8 | 1.0 | 0.8 | 84 | 8 | 515 |

*test samples Nos. 29, 30 are comparative examples

TABLE 21

| test sample No. | size of bubble in dielectric glass layer ($\mu$m) on discharge electrodes | size of bubble in dielectric glass layer ($\mu$m) on address electrodes | dielectric glasslayer voltage endurance (DC, KV) on discharge electrodes | dielectric glasslayer voltage endurance (DC, KV) on address electrodes | dielectric glass layer transmittance (%) | voltage endurance defect after with 200V at 50 kHz (per 20) | panel intensity (cd/m$^2$) |
|---|---|---|---|---|---|---|---|
| 31 | none | none | 3.5 | 3.3 | 95 | 0 | 560 |
| 32 | none | none | 3.5 | 3.3 | 95 | 0 | 568 |
| 33 | 0.1 | 0.1 | 3.2 | 3.1 | 95 | 0 | 563 |
| 34 | 0.1 | 0.1 | 3.1 | 3.0 | 94 | 0 | 567 |
| 35* | 4.0 | 4.1 | 1.0 | 0.8 | 81 | 10 | 517 |
| 36* | 4.2 | 4.0 | 1.1 | 0.9 | 82 | 11 | 514 |

*test samples Nos. 35, 36 are comparative examples

What is claimed is:

1. A manufacturing method of a plasma display panel, the plasma display panel comprising a front panel, including a front glass substrate on which a first electrode and a first dielectric glass layer have been formed, and a back panel, including a back glass substrate on which a second electrode and a phosphor layer have been formed, the front and back panels being positioned so that the first and second electrodes face each other at a predetermined distance, walls being formed between the front and back panels, and spaces surrounded by the front panel, the back panel, and the walls being filled with a dischargeable gas, the plasma display panel manufacturing method being characterized by forming the first dielectric glass layer by firing a glass powder with an average particle diameter of 0.1 to 1.5 $\mu$m and a maximum particle diameter that is no greater than three times the average particle diameter.

2. The plasma display panel manufacturing method according to claim 1, wherein the back panel further includes a second dielectric glass layer, and the plasma display panel manufacturing method forms the second dielectric glass layer by firing a glass powder with an average particle diameter is 0.1 to 1.5 μm and a maximum particle diameter that is no greater than three times the average particle diameter.

3. A manufacturing method of a plasma display panel, the plasma display panel comprising a front panel, including a front glass substrate on which a first electrode and a first dielectric glass layer have been formed, and a back panel, including a back glass substrate on which a second electrode and a phosphor layer have been formed, the front and back panels being positioned so that the first and second electrodes face each other at a predetermined distance, walls being formed between the front and back panels, and spaces surrounded by the front panel, the back panel, and the walls being filled with a dischargeable gas, the plasma display panel manufacturing method being characterized by forming the first dielectric glass layer by applying a first glass paste on the front glass substrate and the first electrode according to a screen printing method and firing a first glass powder in the first glass paste, the first glass paste being a mixture of the first glass powder, at least one of a plasticizer and a surface active agent, a binder, and a binder dissolution solvent, the first glass powder with an average particle diameter of 0.1 to 1.5 μm and a maximum particle diameter that is no greater than three times the average particle diameter.

4. The plasma display panel manufacturing method according to claim 3, wherein the back panel further includes a second dielectric glass layer, and the plasma display panel manufacturing method forms the second dielectric glass layer by applying a second glass paste on the back glass substrate and the second electrode according to the screen printing method and firing a second glass powder in the second glass paste, the second glass paste being a mixture of the second glass powder, at least one of a plasticizer and a surface active agent, a binder, and a binder dissolution solvent, the second glass powder with an average particle diameter of 0.1 to 1.5 μm and a maximum particle diameter that is no greater than three times the average particle diameter.

5. The plasma display panel manufacturing method according to claim 4, wherein the first and second glass pastes include a titanium oxide powder with an average particle diameter of 0.1 to 0.5 μm.

6. A manufacturing method of a plasma display panel, the plasma display panel comprising a front panel, including a front glass substrate on which a first electrode and a first dielectric glass layer have been formed, and a back panel, including a back glass substrate on which a second electrode, a second dielectric glass layer, and a phosphor layer have been formed, the front and back panels being positioned so that the first and second electrodes face each other at a predetermined distance, walls being formed between the front and back panels, and spaces surrounded by the front panel, the back panel, and the walls being filled with a dischargeable gas, the plasma display panel manufacturing method being characterized by (1) forming the first dielectric glass layer by applying a first glass paste on the front glass substrate and the first electrode according to a screen printing method and firing a first glass powder in the first glass paste, the first glass paste being a mixture of 35 to 70 wt. % of the first glass powder and 30 to 65 wt. % of a first binder component, the first glass powder being an oxide glass powder with an average particle diameter of 0.1 to 1.5 μm and a maximum particle diameter that is no greater than three times the average particle diameter, and the first binder component being formed by adding 0.1 to 3.0 wt. % of at least one of a plasticizer and a surface active agent to at least one of acrylic resin, ethyl cellulose, and ethylene oxide that has been dissolved in at least one of terpineol, butyl carbitol acetate, and pentanediol, and by (2) forming the second dielectric glass layer by applying a second glass paste on the back glass substrate and the second electrode according to the screen printing method and firing a second glass powder in the second glass paste, the second glass paste being a mixture of 35 to 70 wt. % of the second glass powder and 30 to 65 wt. % of a second binder component, the second glass powder being formed by adding 5 to 30 wt. % of a titanium oxide powder with an average particle diameter of 0.1 to 0.5 μm to an oxide glass powder with an average particle diameter of 0.1 to 1.5 μm and a maximum particle diameter that is no greater than three times the average particle diameter, and the second binder component being formed by adding 0.1 to 3.0 wt. % of at least one of a plasticizer and a surface active agent to at least one of acrylic resin, ethyl cellulose, and ethylene oxide that has been dissolved in at least one of terpineol, butyl carbitol acetate, and pentanediol.

7. The plasma display panel manufacturing method according to claim 6, wherein at least one of the first and second glass powders includes at least one of a $PbO—B_2O_3—SiO_2—CaO$ glass powder, a $PbO—B_2O_3—SiO_2—MgO$ glass powder, a $PbO—B_2O_3—SiO_2—BaO$ glass powder, a $PbO—B_2O_3—SiO_2—MgO—Al_2O_3$ glass powder, a $PbO—B_2O_3—SiO_2—BaO—Al_2O$ glass powder, a $PbO—B_2O_3—SiO_2—CaO—Al_2O_3$ glass powder, a $Bi_2O_3—ZnO—B_2O_3—SiO_2—CaO$ glass powder, a $ZnO—B_2O_3—SiO_2—Al_2O_3—CaO$ glass powder, a $P_2O_5—ZnO—Al_2O_3—CaO$ glass powder, and an $Nb_2O_5—ZnO—B_2O_3—SiO_2—CaO$ glass powder as the oxide glass powder.

8. The plasma display panel manufacturing method according to claim 7, wherein at least one of the first and second binder components includes at least one of polycarboxylic acid, alkyl diphenyl ether sulfonic acid sodium salt, alkyl phosphate, phosphate salt of a high-grade alcohol, carboxylic acid of polyoxyethylene ethlene diglycerolboric acid ester, polyoxyethylene alkylsulfuric acid ester salt, naphthalenesulfonic acid formalin condensate, glycerol monooleate, sorbitan sesquioleate, and homogenol and a surface active agent.

9. The plasma display panel manufacturing method according to claim 8, wherein at least one of the first and second binder components includes at least one of dibutyl phthalate, dioctyl phthalate, and glycerol as a plasticizer.

10. A manufacturing method of a plasma display panel, the plasma display panel comprising a front panel, including a front glass substrate on which a first electrode and a first dielectric glass layer have been formed, and a back panel, including a back glass substrate on which a second electrode and a phosphor layer have been formed, the front and back panels being positioned so that the first and second electrodes face each other at a predetermined distance, walls being formed between the front and back panels, and spaces surrounded by the front panel, the back panel, and the walls being filled with a dischargeable gas, the plasma display panel manufacturing method being characterized by forming the first dielectric glass layer by applying a first glass paste on the front glass substrate and the first electrode according to one of a die coating method, a spray coating method, a spin coating method, and a blade coating method and firing a first glass powder in the first glass paste, the first glass paste being a mixture of the first glass powder, at least one of a plasticizer and a surface active agent, a binder, and a binder dissolution solvent, the first glass powder with an average particle diameter of 0.1 to 1.5 $\mu$m and a maximum particle diameter that is no greater than three times the average particle diameter.

11. The plasma display panel manufacturing method according to claim 10, wherein the back panel further includes a second dielectric glass layer, and the plasma display panel manufacturing method forms the second dielectric glass layer by applying a second glass paste on the back glass substrate and the second electrode according to one of the die coating method, the spray coating method, the spin coating method, and the blade coating method and firing a second glass powder in the second glass paste, the second glass paste being a mixture of the second glass powder, at least one of a plasticizer and a surface active agent, a binder, and a binder dissolution solvent, the second glass powder with an average particle diameter of 0.1 to 1.5 $\mu$m and a maximum particle diameter that is no greater than three times the average particle diameter.

12. The plasma display panel manufacturing method according to claim 11, wherein the first and second glass pastes include a titanium oxide powder with an average particle diameter of 0.1 to 0.5 $\mu$m.

13. A manufacturing method of a plasma display panel, the plasma display panel comprising a front panel, including a front glass substrate on which a first electrode and a first dielectric glass layer have been formed, and a back panel, including a back glass substrate on which a second electrode, a second dielectric glass layer, and a phosphor layer have been formed, the front and back panels being positioned so that the first and second electrodes face each other at a predetermined distance, walls being formed between the front and back panels, and spaces surrounded by the front panel, the back panel, and the walls being filled with a dischargeable gas, the plasma display panel manufacturing method being characterized by (1) forming the first dielectric glass layer by applying a first glass paste on the front glass substrate and the first electrode according to one of a die coating method, a spray coating method, a spin coating method, and a blade coating method and firing a first glass powder in the first glass paste, the first glass paste being a mixture of 35 to 70 wt. % of the first glass powder and 30 to 65 wt. % of a first binder component, the first glass powder being an oxide glass powder with an average particle diameter of 0.1 to 1.5 $\mu$m and a maximum particle diameter that is no greater than three times the average particle diameter, and the first binder component being formed by adding 0.1 to 3.0 wt. % of at least one of a plasticizer and a surface active agent to at least one of acrylic resin, ethyl cellulose, and ethylene oxide that has been dissolved in at least one of terpineol, butyl carbitol acetate, and pentanediol, and by (2) forming the second dielectric glass layer by applying a second glass paste on the back glass substrate and the second electrode according to one of the die coating method, the spray coating method, the spin coating method, and the blade coating method and firing a second glass powder in the second glass paste, the second glass paste being a mixture of 35 to 70 wt. % of the second glass powder and 30 to 65 wt. % of a second binder component, the second glass powder being formed by adding 5 to 30 wt. % of a titanium oxide powder with an average particle diameter of 0.1 to 0.5 $\mu$m to an oxide glass powder with an average particle diameter of 0.1 to 1.5 $\mu$m and a maximum particle diameter that is no greater than three times the average particle diameter, and the second binder component being formed by adding 0.1 to 3.0 wt. % of at least one of a plasticizer and a surface active agent to at least one of acrylic resin, ethyl cellulose, and ethylene oxide that has been dissolved in at least one of terpineol, butyl carbitol acetate, and pentanediol.

14. The plasma display panel manufacturing method according to claim 13, wherein at least one of the first and second glass powders includes at least one of a $PbO—B_2O_3—SiO_2—CaO$ glass powder, a $PbO—B_2O_3—SiO_2—MgO$ glass powder, a $PbO—B_2O_3—SiO_2—BaO$ glass powder, a $PbO—B_2O_3—SiO_2—MgO—Al_2O_3$ glass powder, a $PbO—B_2O_3—SiO_2—BaO—Al_2O$ glass powder, a $PbO—B_2O_3—SiO_2—CaO—Al_2O_3$ glass powder, a $Bi_2O_3—ZnO—B_2O_3—SiO_2—CaO$ glass powder, a $ZnO—B_2O_3—SiO_2—Al_2O_3—CaO$ glass powder, a $P_2O_5—ZnO—Al_2O_3—CaO$ glass powder, and an $Nb_2O_3—ZnO—B_2O_3—SiO_2—CaO$ glass powder as the oxide glass powder.

15. The plasma display panel manufacturing method according to claim 14, wherein at least one of the first and second binder components includes at least one of polycarboxylic acid, alkyl diphenyl ether sulfonic acid sodium salt, alkyl phosphate, phosphate salt of a high-grade alcohol, carboxylic acid of polyoxyethylene ethylene diglycerolboric acid ester, polyoxyethylene alkylsulfuric acid ester salt, naphthalenesulfonic acid formalin condensate, glycerol monooleate, sorbitan sesquioleate, and homogenol as a surface active agent.

16. The plasma display panel manufacturing method according to claim 15, wherein at least one of the first and second binder components includes at least one of dibutyl phthalate, dioctyl phthalate, and glycerol as a plasticizer.

17. The plasma display panel manufacturing method according to claim 16, wherein a viscosity of the first and second glass pastes is 100 to 50,000 cp.

18. A manufacturing method of a plasma display panel, the plasma display panel comprising a front panel, including a front glass substrate on which a first electrode and a first dielectric glass layer have been formed, and a back panel, including a back glass substrate on which a second electrode, a second dielectric glass layer, and a phosphor layer have been formed, the front and back panels being positioned so that the first and second electrodes face each other at a predetermined distance, walls being formed between the front and back panels, and spaces surrounded by the front panel, the back panel, and the walls being filled with a dischargeable gas, the plasma display panel manufacturing method being characterized by forming the second dielectric glass layer by firing a glass powder with an average particle diameter of 0.1 to 1.5 μm and a maximum particle diameter that is no greater than three times the average particle diameter.

* * * * *

UNITED STATES PATENT AND TRADEMARK OFFICE

CERTIFICATE OF CORRECTION

PATENT NO. : 6,439,943 B1
DATED : August 27, 2002
INVENTOR(S) : Aoki et al.

It is certified that error appears in the above-identified patent and that said Letters Patent is hereby corrected as shown below:

Column 44,
Line 57, delete the second occurrence of "and" and insert -- as --.

Signed and Sealed this

Eighth Day of July, 2003

JAMES E. ROGAN
*Director of the United States Patent and Trademark Office*